(12) United States Patent
Kurashige et al.

(10) Patent No.: US 8,699,109 B2
(45) Date of Patent: Apr. 15, 2014

(54) PROJECTION TYPE IMAGE DISPLAY APPARATUS AND IMAGE DISPLAY METHOD

(75) Inventors: Makio Kurashige, Tokyo (JP); Yasuyuki Oyagi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 563 days.

(21) Appl. No.: 12/857,752

(22) Filed: Aug. 17, 2010

(65) Prior Publication Data
US 2011/0043876 A1  Feb. 24, 2011

(30) Foreign Application Priority Data
Aug. 20, 2009  (JP) ................................. 2009-190798

(51) Int. Cl.
*G03H 1/10*  (2006.01)
(52) U.S. Cl.
USPC .......................................................... 359/10
(58) Field of Classification Search
USPC ...................................... 359/1–35, 246–258
See application file for complete search history.

(56) References Cited

U.S. PATENT DOCUMENTS

| | | | |
|---|---|---|---|
| 5,313,479 A | 5/1994 | Florence | |
| 7,477,435 B2 | 1/2009 | Yonekubo et al. | |
| 8,007,133 B2 | 8/2011 | Yamauchi et al. | |
| 8,335,028 B2 | 12/2012 | Renaud-Goud | |
| 2003/0039036 A1 | 2/2003 | Kruschwitz et al. | |
| 2008/0174873 A1* | 7/2008 | Sumiyama et al. | 359/589 |
| 2010/0165297 A1 | 7/2010 | Mizushima et al. | |

FOREIGN PATENT DOCUMENTS

| | | |
|---|---|---|
| JP | 6-208089 A | 7/1994 |
| JP | 7-261203 A | 10/1995 |
| JP | 2000-19641 A | 1/2000 |
| JP | 2002-55307 A | 2/2002 |
| JP | 2003-98476 A | 4/2003 |
| JP | 2004-264512 A | 9/2004 |
| JP | 2007-25466 A | 2/2007 |

(Continued)

OTHER PUBLICATIONS espacenet English abstract of JP 2004-264512 A.

(Continued)

*Primary Examiner* — Jennifer L. Doak
(74) *Attorney, Agent, or Firm* — Ladas & Parry LLP

(57) ABSTRACT

Parallel coherent light from the laser 210 is irradiated through the light bending device 215 onto the hologram recording medium 220 having a hologram image of a scatter plate recorded, and a hologram reproduction real image 235 of the scatter plate is generated using the parallel light flux LL as illumination light for reproduction. The spatial light modulator 240 composed of a liquid crystal display, etc., is disposed so as to overlap on the position of the hologram reproduction real image 235, thereby obtaining a modulated image on a surface of the reproduction real image 235 of the scatter plate. The modulated image is projected onto the screen 260 by the projection optical system 250. The light bending device 215 is composed of a diffraction grating in which the pitch and direction of the grating lines are changed in terms of time, wherein the irradiation angle of the parallel light flux LL is changed in terms of time, and the illumination light beam scans on the screen 260. The scanning speed is caused to become 200 mm/sec or more, and the distribution angle of incident light θ incident into point Q1 is caused to become 0.4 degrees or more.

14 Claims, 11 Drawing Sheets

(56) References Cited

FOREIGN PATENT DOCUMENTS

| | | |
|---|---|---|
| JP | 2008/20485 A | 1/2008 |
| JP | 2008-152019 A | 7/2008 |
| JP | 2009-524096 A | 6/2009 |
| JP | 2009-163901 A | 7/2009 |
| WO | 2008/142852 A1 | 11/2008 |

OTHER PUBLICATIONS espacenet English abstract of JP 6-208089 A.
Copending U.S. Appl. No. 12/857,720.
Goodman, J. W., "Speckle Phenomena in Optics", Roberts & Company, 2006, pp. 203-225.
JPO Office Action (Reason of Rejection) dated Jul. 9, 2013 for Application No. JP 2009-045238.
Espacenet English abstract of JP2008-152019 A dated Jul. 2008.
Espacenet English abstract of JP 2000-19641 A dated Jan. 2000.
Espacenet English abstract of JP 2007-25466 A dated Feb. 2007.
Espacenet English abstract of JP 2003-98476 A dated Apr. 2003.
Espacenet English abstract of JP 2008/20485 A dated Jan. 2008.
JPO Office Action dated May 7, 2013 for Application No. JP 2009-190798.
Espacenet English abstract of JP 2009-163901 A dated Jul. 2009.
Espacenet English abstract of JP 7-261203 A dated Oct. 1995.
Espacenet English abstract of JP 2002-55307 A dated Feb. 2002.
Espacenet English abstract of JP 2009-524096 A dated Jun. 2009.

* cited by examiner

PRIOR ART

PRIOR ART

| | CONDITION | SPECKLE CONTRAST (%) |
|---|---|---|
| 1 | LASER (GREEN) WITHOUT DIFFUSING ELEMENT | 20.7 |
| 2 | LASER (GREEN) WITH DIFFUSING ELEMENT | 17.9 |
| 3 | LED (GREEN) WITHOUT DIFFUSING ELEMENT | 4.0 |

PROJECTION TYPE IMAGE DISPLAY APPARATUS AND IMAGE DISPLAY METHOD

BACKGROUND OF THE INVENTION

The present invention relates to a projection type image display apparatus and an image display method, and in particular, relates to a technology for displaying images on a screen by illuminating a spatial light modulator using light from a coherent light source.

As a projection type image display apparatus for displaying images by projecting light onto a screen, various types of apparatuses have been proposed, including an apparatus available on the market, which is a so-called "optical type projector." The basic principle of such a projection type image display apparatus is to generate an original two-dimensional image by utilizing a spatial light modulator such as a liquid crystal micro-display or a DMD (Digital Micro-mirror Device), and to magnify and project the two-dimensional images on a screen by utilizing a projection optical system.

A general optical type projector adopts a system which illuminates a spatial light modulator such as a liquid crystal display using a white light source such as a high pressure mercury lamp, magnifies a modulated image thus obtained, by means of lenses and projects the same on a screen. For example, Japanese Patent Publication No. 2004-264512A discloses a technology that divides white light generated by a super high pressure mercury lamp into three prime color components of R (red), G (green), and B (blue) by means of a dichroic mirror, leads these lights to respective spatial light modulators for the prime colors, synthesizes modulated images thus generated for each of the prime colors by means of a cross dichroic prism and projects the same on a screen.

However, the service life of a high brightness discharge lamp such as a high pressure mercury lamp is comparatively short, wherein if such a lamp is utilized in an optical type projector, etc., it is necessary to frequently change the lamp. Further, since it is necessary to utilize a comparatively large optical system such as a dichroic mirror, in order to pick up lights of respective prime colors, there is a disadvantage that the entire apparatus becomes large-sized. Therefore, a system which uses a coherent light source such as a laser has been proposed. For example, a semiconductor laser which is widely utilized industrially has a remarkably long service life in comparison with a high brightness discharge lamp such as a high pressure mercury lamp. Also, since the semiconductor laser is a light source which is able to generate light of a single wavelength, a spectroscopic instrument such as a dichroic mirror is no longer required, so that there is an advantage that the entire apparatus can be made small-sized.

On the other hand, in a system in which a coherent light source such as a laser is used, a new problem of generation of speckles is brought about. The speckles form a spot-like pattern appearing when coherent light such as a laser light is irradiated on a diffusing surface, and is observed as spot-like unevenness in brightness, which is generated on a screen. The speckles become a factor which adversely physiologically affects an observer. The reason why speckles are generated when the coherent light is used is that the coherent lights reflected from respective parts of a diffusing reflection surface such as a screen have remarkably high coherency and the lights interfere with each other. For example, "Speckle Phenomena in Optics" by Joseph W. Goodman, Roberts & Company Publishers 2006, provides detailed theoretical consideration with respect to generation of speckles.

Thus, since a problem inherent to the system using a coherent light source, which is generation of speckles, is brought about in the system, a technology to control generation of speckles has been proposed. For example, Japanese Patent Publication No. 6-208089A (1994) discloses a technology in which laser light is irradiated to a scatter plate, the thus obtained scattered light is led to a spatial light modulator, and the scatter plate is driven and rotated by a motor, thereby reducing the speckles.

As described above, although, in a projection type image display apparatus using a coherent light source, a technology to reduce speckles has been proposed, it is not possible to efficiently and sufficiently control the speckles by means of conventionally proposed methods. For example, with the method disclosed in Japanese Patent Publication No. 6-208089A (1994), since laser light is irradiated onto a scatter plate and is scattered, a part of the laser light is wasted without contributing to image display. In addition, although it is necessary to rotate the scatter plate in order to reduce the speckles, such a mechanical rotation mechanism becomes a comparatively large apparatus, and power consumption is increased. Further, since the position of the optical axis of illumination light does not change even if the scatter plate is rotated, it is not possible to sufficiently control the speckles generated on the diffusing surface of a screen.

SUMMARY OF THE INVENTION

Therefore, it is an object of the present invention to provide a technology capable of efficiently and sufficiently controlling generation of speckles in a projection type image display apparatus using a coherent light source.

(1) The first feature of the present invention resides in a projection type image display apparatus for projecting light onto a screen and displaying an image thereon, comprising:

a coherent light generating unit for generating coherent light including almost parallel light flux;

a time-changing-light-bending-device having a function of bending the coherent light generated by the coherent light generating unit in a predetermined bending direction at a predetermined bending angle and a function of changing at least one of the bending direction and the bending angle in terms of time;

a hologram recording medium for generating a hologram reproduction real image of a scatter plate by receiving the coherent light, which is bent by the time-changing-light-bending-device, as illumination light for reproduction;

a spatial light modulator disposed so as to overlap on a position where the hologram reproduction real image is generated; and a projection optical system for projecting a modulated image obtained on the spatial light modulator onto the screen.

(2) The second feature of the present invention resides in the projection type image display apparatus according to the first feature, wherein the coherent light generating unit includes:

a laser light source for generating and emitting laser light; and a light flux magnifying unit for magnifying the laser light emitted from the laser light source to an almost parallel light flux having a predetermined sectional area.

(3) The third feature of the present invention resides in the projection type image display apparatus according to the first feature, wherein the hologram recording medium is composed of a volume hologram using a photopolymer.

(4) The fourth feature of the present invention resides in the projection type image display apparatus according to the first feature, wherein the coherent light generating unit generates coherent light having a wavelength which is almost the same as a wavelength of light used when recording an image of a scatter plate on the hologram recording medium; and the time-changing-light-bending-device changes the coherent light, using a light path of a reference light used to record an image of a scatter plate on the hologram recording medium as a standard light path, so that an incident light path of the coherent light onto the hologram recording medium cyclically moves around a vicinity of the standard light path.

(5) The fifth feature of the present invention resides in the projection type image display apparatus according to the first feature, wherein the spatial light modulator is composed of a transmission type or a reflection type liquid crystal display or a digital micro-mirror device.

(6) The sixth feature of the present invention resides in the projection type image display apparatus according to the first feature, wherein the projection optical system carries out forward projection by which a modulated image is projected onto an observation plane side of a screen.

(7) The seventh feature of the present invention resides in the projection type image display apparatus according to the first feature, wherein the time-changing-light-bending-device includes a transmission type or reflection type liquid crystal display having resolution required to display a diffraction grating pattern having a function of diffracting coherent light, and a display controller to give electrical signals to the liquid crystal display so that the diffraction grating pattern changes in terms of time, and the coherent light generated by the coherent light generating unit is bent by diffraction by the diffraction grating pattern.

(8) The eighth feature of the present invention resides in the projection type image display apparatus according to the seventh feature, wherein the display controller changes a bending angle of the coherent light in terms of time by cyclically increasing and decreasing a pitch of grating lines of the diffraction grating pattern, and controls so that the diffracted coherent light oscillates in a direction orthogonal to the grating lines.

(9) The ninth feature of the present invention resides in the projection type image display apparatus according to the seventh feature, wherein the display controller changes a bending direction of the coherent light in terms of time by changing a direction of grating lines of the diffraction grating pattern, and controls so that a light path of the diffracted coherent light cyclically moves along a conical surface.

(10) The tenth feature of the present invention resides in the projection type image display apparatus according to the seventh feature, wherein the display controller changes a bending angle of the coherent light in terms of time by cyclically increasing and decreasing a pitch of grating lines of the diffraction grating pattern and changes a bending direction of the coherent light in terms of time by changing a direction of grating lines of the diffraction grating pattern, and controls the diffracted coherent light so as to cyclically move with a motion component by which the diffracted coherent light oscillates in a direction orthogonal to the grating lines and a motion component by which a light path cyclically moves along a conical surface.

(11) The eleventh feature of the present invention resides in the projection type image display apparatus according to the first feature, wherein the time-changing-light-bending-device includes a digital micro-mirror device and a direction controller by which electrical signals to control a direction of individual mirrors are given to the digital micro-mirror device, and the coherent light generated by the coherent light generating unit is bent based on reflection by the digital micro-mirror device.

(12) The twelfth feature of the present invention resides in the projection type image display apparatus according to the eleventh feature, wherein the direction controller changes a bending angle of the coherent light in terms of time by giving electrical signals which cause normals of individual mirrors of the digital micro-mirror device to oscillate on a oscillation surface parallel to a predetermined reference plane, and controls reflected coherent light so that the reflected coherent light oscillates on the oscillation surface.

(13) The thirteenth feature of the present invention resides in the projection type image display apparatus according to the eleventh feature, wherein the direction controller changes a bending direction of the coherent light in terms of time by giving electrical signals which cause normals of individual mirrors of the digital micro-mirror device to move along a predetermined conical surface and controls reflected coherent light so that a light path of the reflected coherent light cyclically moves along a conical surface.

(14) The fourteenth feature of the present invention resides in the projection type image display apparatus according to the eleventh feature, wherein the direction controller changes a bending direction and a bending angle of the coherent light in terms of time by giving electrical signals which cause normals of individual mirrors of the digital micro-mirror device to cyclically move with a motion component by which said normals are caused to oscillate on a oscillation surface parallel to a predetermined reference plane and a motion component by which said normals are caused to cyclically move along a predetermined conical surface.

(15) The fifteenth feature of the present invention resides in the projection type image display apparatus according to the first feature, wherein characteristics and an arrangement of the spatial light modulator and the characteristics and an arrangement of the projection optical system are set so that a distribution angle of incident light at any optional point on the screen becomes 0.4 degrees or more, and either a bending direction or a bending angle by the time-changing-light-bending-device or both of them are changed in terms of time so that a linear speed of light scanning on the screen becomes 200 mm or more per second.

(16) The sixteenth feature of the present invention resides in a projection type image display apparatus for projecting light onto a screen and displaying a color image thereon, comprising:

a first coherent light generating unit for generating coherent light which has a first wavelength band and includes an almost parallel light flux;

a first time-changing-light-bending-device having a function of bending coherent light generated by the first coherent light generating unit in a predetermined bending direction at a predetermined bending angle and a function of changing at least one of the bending direction and the bending angle in terms of time;

a first hologram recording medium for generating a first hologram reproduction real image of a scatter plate by receiving coherent light, which is bent by the first time-changing-light-bending-device, as illumination light for reproduction;

a first spatial light modulator disposed so as to overlap on a position where the first hologram reproduction real image is formed and which carries out modulation based on an image having a first prime color component corresponding to the first wavelength;

a second coherent light generating unit for generating coherent light which has a second wavelength band and includes an almost parallel light flux;

a second time-changing-light-bending-device having a function of bending coherent light generated by the second coherent light generating unit in a predetermined bending direction at a predetermined bending angle and a function of changing at least one of the bending direction and the bending angle in terms of time;

a second hologram recording medium for generating a second hologram reproduction real image of a scatter plate by receiving coherent light, which is bent by the second time-changing-light-bending-device, as illumination light for reproduction;

a second spatial light modulator disposed so as to overlap on a position where the second hologram reproduction real image is formed and which carries out modulation based on an image having a second prime color component corresponding to the second wavelength;

a third coherent light generating unit for generating coherent light which has a third wavelength band and includes an almost parallel light flux;

a third time-changing-light-bending-device having a function of bending coherent light generated by the third coherent light generating unit in a predetermined bending direction at a predetermined bending angle and a function of changing at least one of the bending direction and the bending angle in terms of time;

a third hologram recording medium for generating a third hologram reproduction real image of a scatter plate by receiving coherent light, which is bent by the third time-changing-light-bending-device, as illumination light for reproduction;

a third spatial light modulator disposed so as to overlap on a position where the third hologram reproduction real image is formed and which carries out modulation based on an image having a third prime color component corresponding to the third wavelength; and an image-synthesizing projection optical system for synthesizing a first modulated image obtained on the first spatial light modulator, a second modulated image obtained on the second spatial light modulator and a third modulated image obtained on the third spatial light modulator, and projecting a synthesized image onto the screen.

(17) The seventeenth feature of the present invention resides in a projection type image display method for projecting light onto a screen and displaying an image thereon, comprising the steps of;

preparing a hologram recording medium having a hologram image of a scatter plate recorded;

irradiating coherent light to the hologram recording medium at a predetermined irradiation angle from a predetermined irradiation direction and generating a hologram reproduction real image of the scatter plate;

disposing a spatial light modulator so as to overlap on a position where the hologram reproduction real image is generated; and projecting a modulated image obtained on the spatial light modulator onto the screen;

wherein at least one of the irradiation direction and the irradiation angle is changed in terms of time.

(18) The eighteenth feature of the present invention resides in the projection type image display method according to the seventeenth feature, wherein a distribution angle of incident light at any optional point on the screen becomes 0.4 degrees or more, and a linear speed of light scanning on the screen becomes 200 mm or more per second.

In the present invention, a hologram reproduction of a real image of a scatter plate is formed at the position of the existing spatial light modulator so as to overlap on the position. Therefore, a modulated image obtained on the spatial light modulator will be projected on a screen with a behavior similar to the scattered light directly scattered from the scatter plate, and becomes able to efficiently and sufficiently control generation of speckles on the screen. Although the illumination light for reproduction which is irradiated on the hologram recording medium is coherent light, an incident angle is deviated in time so that light flux scanning is carried out on the screen. Therefore it becomes possible to further reduce generation of speckles.

DESCRIPTION OF THE PREFERRED EMBODIMENTS

Hereinafter, a description is given of the present invention based on the illustrated embodiment.

<<<Section 1. Conventionally Proposed Projection Type Image Display Apparatus>>>

Figure 1:
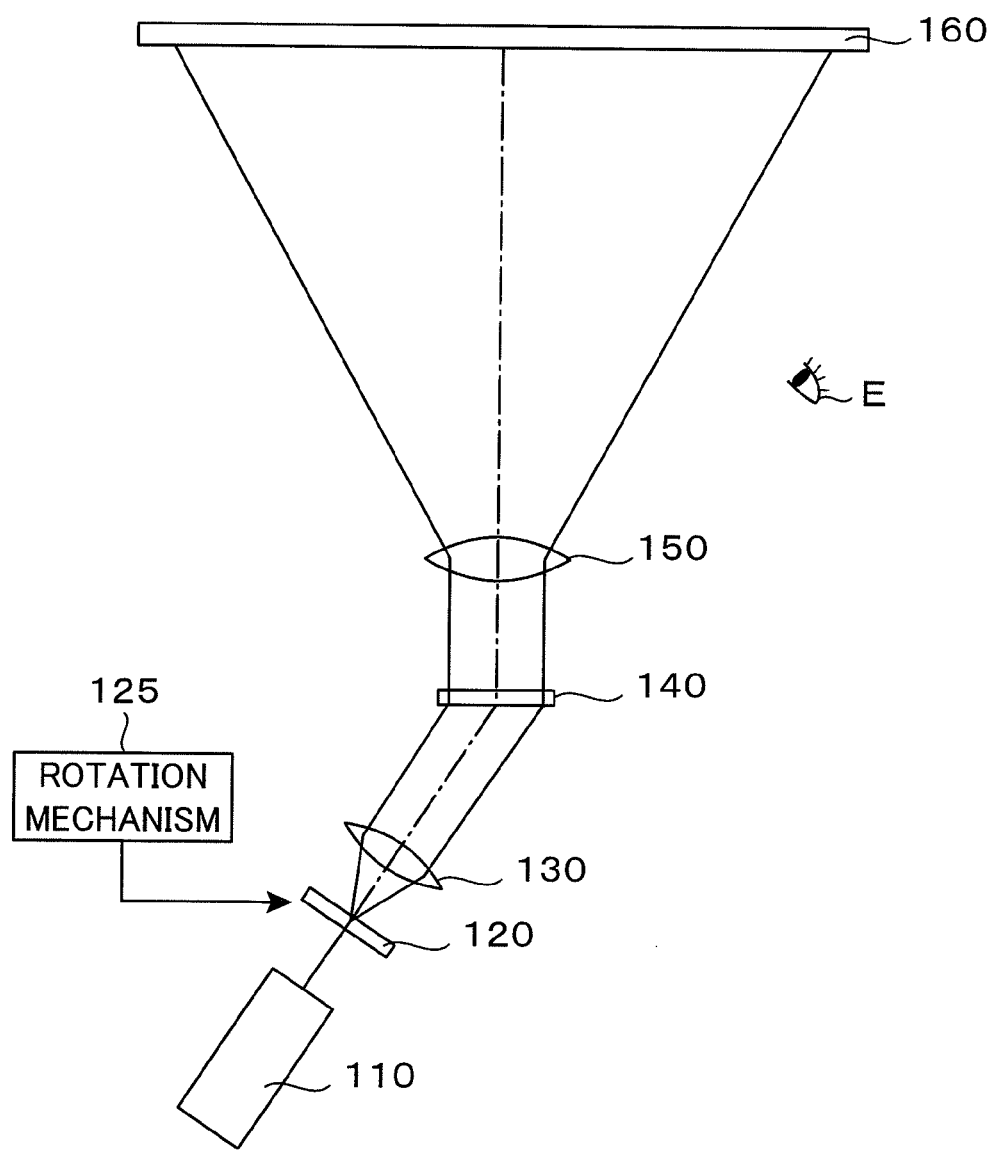
FIG. 1 is a plan view showing an example of a coherent light projection type image display apparatus having a function of controlling generation of speckles, which has conventionally been proposed.

Here, for convenience, a description is given of the basic principle of a conventional projection type image display apparatus using coherent light which was proposed in, for example, Japanese Patent Publication No. 6-208089A (1994), etc., with reference to the plan view of FIG. 1.

As illustrated, in the projection type image display apparatus, coherent light generated from a coherent light source 110 such as a laser is irradiated onto a transmission type scatter plate 120, the thus obtained scattered light is condensed by a light condensing lens 130, and is led to a spatial light modulator 140. If, for example, a transmission type liquid crystal micro-display is used as the spatial light modulator 140, a modulated image will be obtained on a screen of the display. If the thus obtained modulated image is projected onto a screen 160 by means of a projection optical system 150, a magnified modulated image will be displayed on the screen 160.

In addition, a reflection type micro-display may be used as the spatial light modulator 140. In this case, the coherent light source 110, the scatter plate 120 and the light condensing lens 130 are disposed obliquely upwards of the spatial light modulator 140 in FIG. 1, wherein the reflection light from the spatial light modulator 140 will be projected on the screen 160 by the projection optical system 150. Where such reflection light is utilized, a MEMS element such as a DMD (Digital Micro-mirror Device) may be used as the spatial light modulator 140. In fact, the embodiment disclosed in Japanese Patent Publication No. 6-208089A (1994) is a reflection type apparatus in which the DMD is utilized as the spatial light modulator 140.

In addition, although the illustrated example is a forward projection type apparatus in which a subject is observed in a state where the viewpoint E is placed at this side of the screen 160, a rearward projection type apparatus in which a subject is observed in a state where the viewpoint E is placed at the other side of the screen 160 (a so-called rear projection apparatus) is widely utilized.

As already described above, in an apparatus in which a coherent light source 110 such as a laser is utilized, a problem by which speckles are generated on the screen 160 is brought about. A speckle is a spot-like pattern appearing when coherent light is irradiated on a scatter surface, which is brought about by interference of the coherent light reflected from respective parts of the scatter surface. Therefore, in the embodiment disclosed in Japanese Patent Publication No. 6-208089A (1994), such a device is applied, which reduces generation of speckles by driving and rotating the scatter plate 120 with the optical axis of laser light used as the center axis by the rotation mechanism 125.

The above-mentioned "Speckle Phenomena in Optics" by Joseph W. Goodman refers to that, in order to reduce generation of speckles, it is effective to multiplex the modes of polarization, phase, or angle spatially or timely. If the scatter plate 120 is driven and rotated, the modes of the scattered light emitted from the scatter plate 120 are multiplexed, and it is possible to resultantly reduce generation of speckles on the screen 160.

Figure 2:
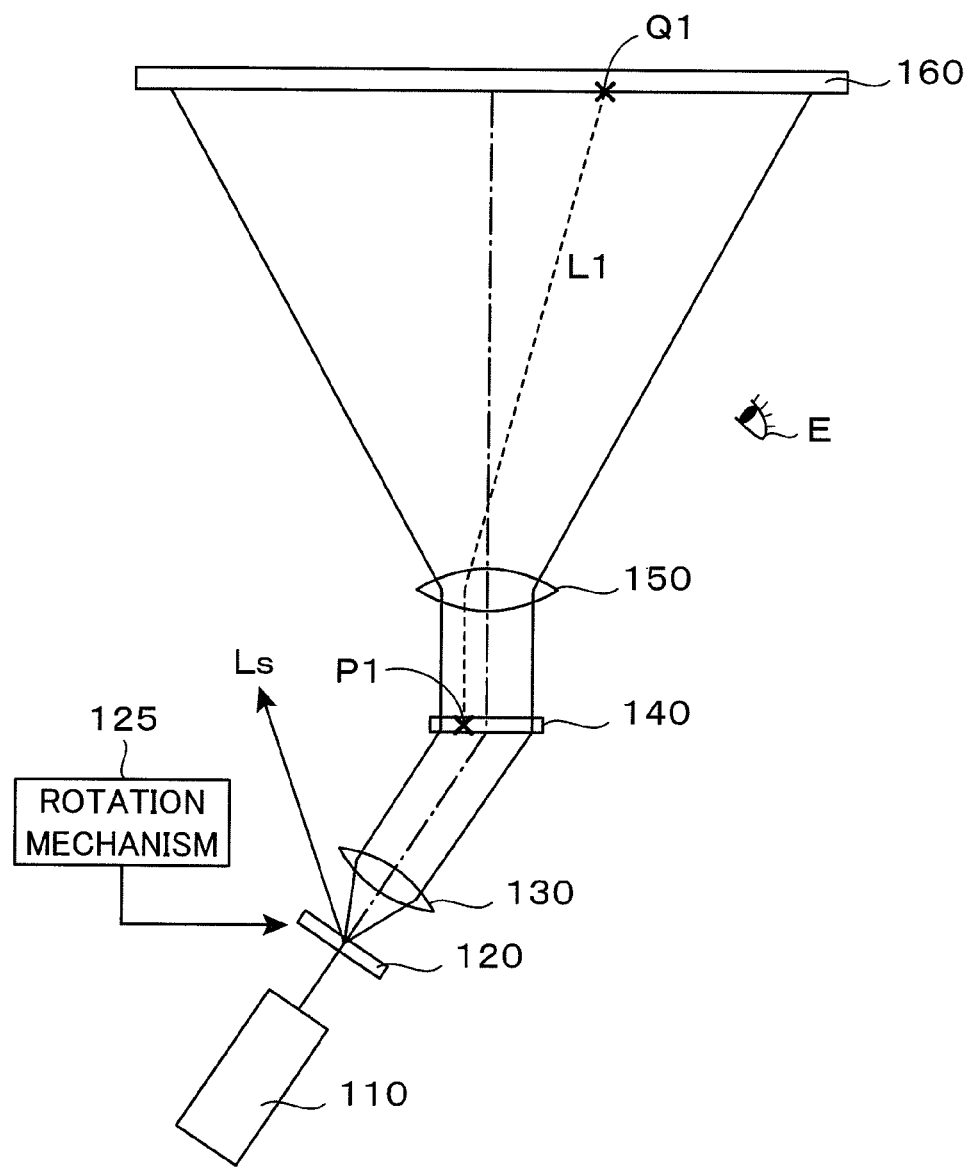
FIG. 2 is a plan view to show problematic points in the projection type image display apparatus shown in FIG. 1.

However, in the apparatus of such a type as conventionally proposed, it is difficult to efficiently and sufficiently control generation of speckles as described above. FIG. 2 is a plan view showing problematic points of the projection type image display apparatus shown in FIG. 1. The configuration itself of the apparatus shown in FIG. 2 is identical to that of the apparatus shown in FIG. 1. Hereinafter, with reference to FIG. 2, a detailed description is given of some problematic points of the prior art apparatus.

First, since laser light irradiated onto the scatter plate 120 is scattered in various directions, there exists scattered light going in directions along which the laser light is not condensed by the light condensing lens 130, for example, like the light exemplarily illustrated as the scattered light Ls in FIG. 2. Thus, since a part of the laser light is wasted without contributing to the image display, there is a problem in view of utilization efficiency of energy.

Second, driving and rotating of the scatter plate 120 by the rotation mechanism 125 to reduce the speckles cannot be necessarily said to be an efficient method. That is, the greater the mass of the scatter plate 120 is, the more the power consumption is brought about to rotate the scatter plate. Actually, power necessary to give a rotating moment to the scatter plate 120 at all times cannot be disregarded, and since a mechanical rotating structure is needed, this hinders downsizing of the apparatus.

And, third, since the position of the optical axis of the illumination light supplied from the coherent light source 110 to the screen 160 is not changed even if the scatter plate 120 is rotated, it is not possible to sufficiently control speckles generated on the scatter surface of the screen 160. In the case of the apparatus shown in FIG. 2, scattering of light contributing to generation of speckles is originated on two surfaces which are a surface of the scatter plate 120 and a surface of the screen 160. If the scatter plate 120 is rotated, speckles (that is, speckles resulting from the light source side of the illumination light) resulting from scattering on the scatter plate 120 can be reduced. However, speckles (that is, speckles resulting from the screen side) resulting from scattering on the screen 160 cannot be reduced sufficiently.

Here, attention is paid to the distribution angle of incident light (as described later, the distribution range of the incident angle onto the screen 160) of projection light L1 reaching an optional projection point Q1 on the screen 160 illustrated. In the case of the illustrated apparatus, the spatial light modulator 140 has a function of transmitting the illumination light, which is incident from the light condensing lens 130, toward the projection optical system 150 after modulating the illumination light. Therefore, pixel information of the image point P1 will be projected, as it is, to the projection point Q1 on the screen 160 by the projection light L1. This means that the distribution angle of incident light is remarkably narrow when the projection optical system 150 is observed from the projection point Q1. Even if the scatter plate 120 is rotated, the optical path of the projection light L1 illuminating the projection point Q1 does not change, and the incident angle becomes constant at all times. Thus, if the coherent light is irradiated to the surface of the screen 160 from the same direction at all times, this becomes a major factor to generate speckles, wherein driving and rotating of the scatter plate 120 are useless in view of reducing such speckles resulting from the screen side.

The present invention proposes a novel technology to solve such problems of such prior art apparatus. Hereinafter, a description is given of the basic embodiment of the present invention.

<<<Section. 2 Basic Embodiment of the Present Invention>>>

Figure 3:
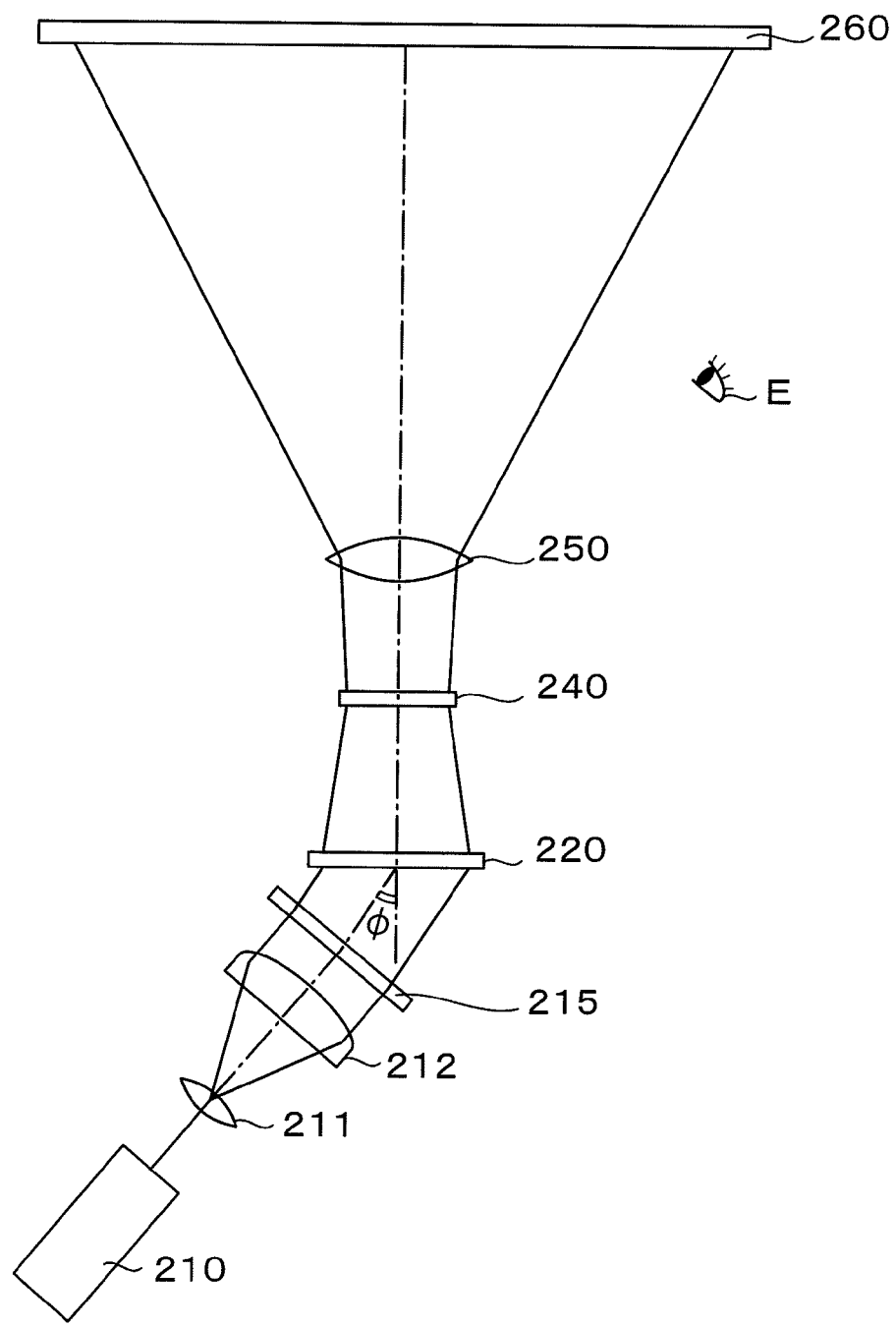
FIG. 3 is a plan view showing a basic embodiment of a projection type image display apparatus according to the present invention.

FIG. 3 is a plan view showing a basic embodiment of a projection type image display apparatus according to the present invention. In the projection type image display apparatus, coherent light generated from a coherent light source 210 is used. In the case of the apparatus, a laser light source which generates and emits laser light is adopted as the coherent light source 210. The emitted laser light is widened to a parallel light flux having a predetermined sectional area by means of a light flux magnifying unit consisting of a magnification lens 211 and a collimate lens 212. Also, in actual applications, the light flux is not strictly a parallel light flux, and an almost parallel light flux may be used and does not constitute any hindrance.

Thus, the coherent light source 210 (laser light source), the magnification lens 211 and the collimate lens 212, which are illustrated, function as a unit for generating coherent light consisting of a parallel light flux. As illustrated, the coherent light consisting of a parallel light flux is made incident into the hologram recording medium 220 at a predetermined incident angle ϕ after being bent by a time-changing-light-bending-device 215. The time-changing-light-bending-device 215 has a function of bending the coherent light generated by the coherent light generating unit by a predetermined bending angle (an angle formed by an incident light beam and an emission light beam) in a predetermined bending direction (an azimuth of a plane including an incident light beam and an emission light beam), and has a function of changing at least one of the bending direction and the bending angle in terms of time.

For example, with respect to the incident light flux parallel to the paper of the drawing, if only the bending angle (the angle formed by the incident light beam and the emission light beam) is changed in terms of time with the bending direction (the azimuth of the plane including the incident light beam and the emission light beam) fixed in the direction parallel to the paper of the drawing, the incident light into the hologram recording medium 220 maintains a light flux parallel to the paper of the drawing, wherein the incident angle ϕ illustrated will be changed in terms of time. On the other hand, if the bending direction is changed in terms of time, an angle between the incident light into the hologram recording medium 220 and the paper plane of the drawing will be changed in terms of time.

Thus, the coherent light bent by the time-changing-light-bending-device 215 functions as illumination light for reproduction for the hologram recording medium 220 as described later. Therefore, in actual applications, it is preferable that the magnification lens 211 and the collimate lens 212 magnify the light flux of a laser beam to such a degree that the illumination light for reproduction, which consists of a parallel light flux, is irradiated to the entire area of the recording surface of the hologram recording medium 220. As a matter of course, since respective points of the hologram recording medium 220 have a function of reproducing an image of the scatter plate, it is preferable that, although the illumination light for reproduction does not necessarily have a sectional area necessary to irradiate the entire area of the recording surface, the section of the parallel light flux is set so as to become such an area which is capable of irradiating almost the entire area of the recording surface of the hologram recording medium 220 in order to obtain a bright image on a screen by efficiently utilizing the light generated by the coherent light source 210.

As described above, although the incident state of the coherent light into the hologram recording medium 220 is changed in terms of time by the time-changing-light-bending-device 215, in this case, it is preferable that the amount of change is controlled within a predetermined range so that almost the entire area of the recording surface of the hologram recording medium 220 is irradiated.

In the hologram recording medium 220, a hologram image of a scatter plate (optical diffusing plate) is recorded in advance. In other words, it is devised that a hologram reproduction real image of the corresponding scatter plate is generated when the coherent light consisting of the above parallel light flux is irradiated as illumination light for reproduction.

Figure 4:
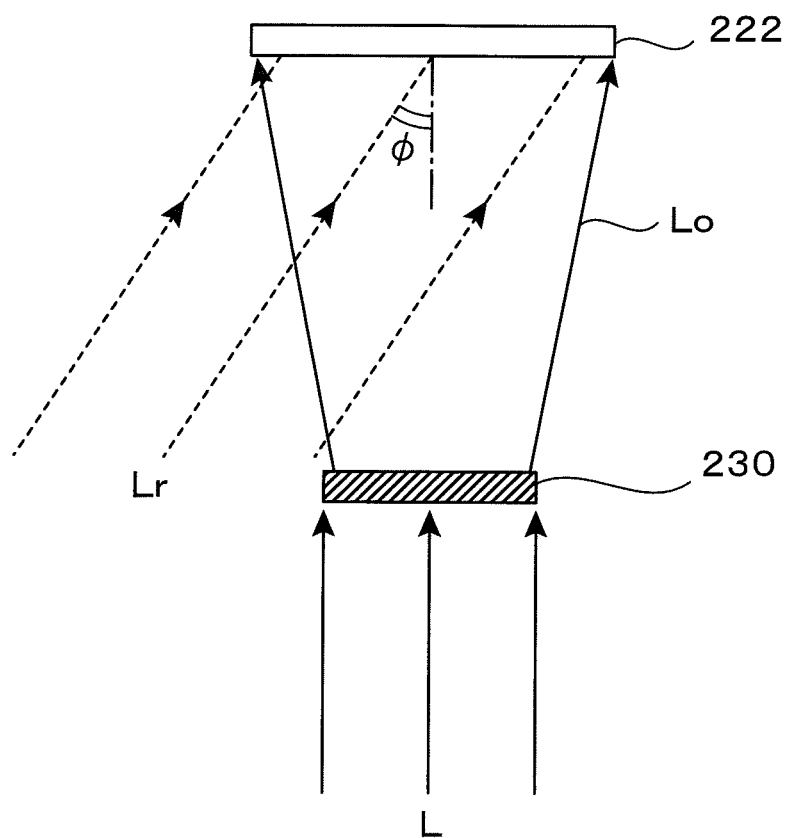
FIG. 4 is a plan view showing a method for creating a hologram recording medium 220 in the apparatus shown in FIG. 3.

FIG. 4 is a plan view showing a method for creating the hologram recording medium 220. The scatter plate 230 shown in the drawing is a transmission type scatter plate (for example, an opal glass plate) inside which fine grains (light scattering substances) to scatter light are kneaded, and the hologram photosensitive medium 222 is a photosensitive medium used to record a hologram image. In the illustrated example, laser light having a predetermined wavelength λ is irradiated from downwards of the scatter plate 230 as illumination light L, and a hologram is recorded by using scattered light, which is produced by scattering based on the scattered plate 230, as substance light Lo. At this time, laser light having the same wavelength λ as the illumination light L is irradiated to the hologram photosensitive medium 222 at the incident angle ϕ as the reference light Lr, wherein an interference fringe pattern between the substance light Lo and the reference light Lr is recorded on the recording surface of the hologram photosensitive medium 222.

Figure 5:
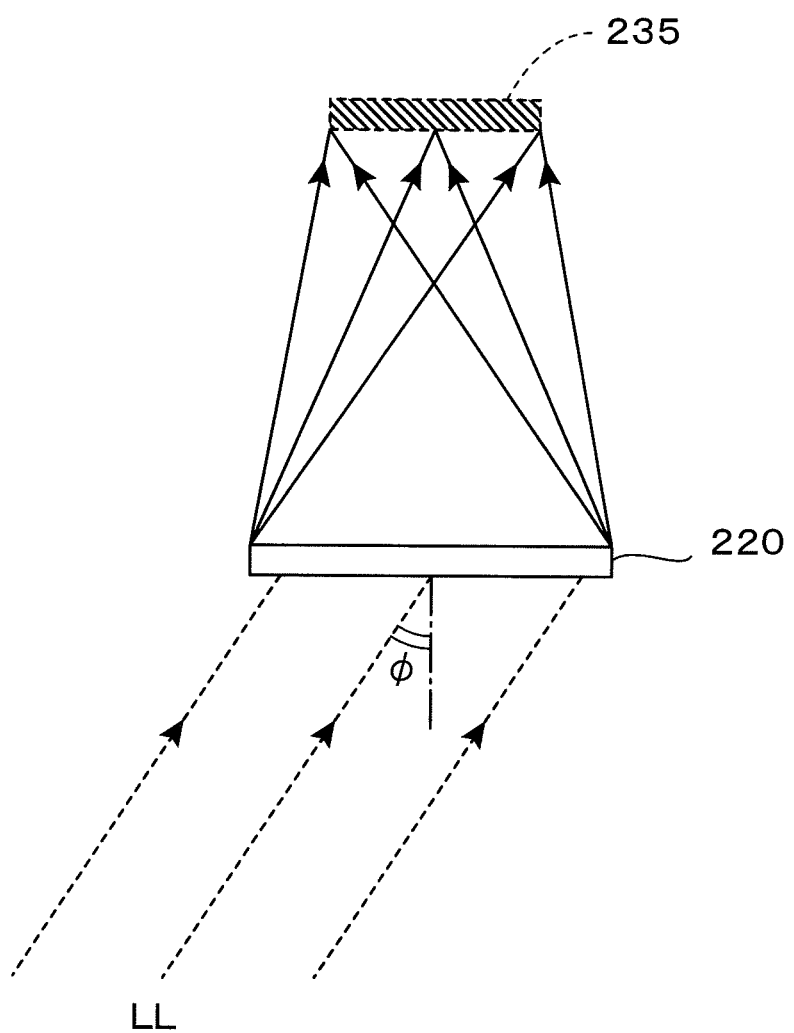
FIG. 5 is a plan view showing a state of reproducing a real image by the hologram recording medium 220 in the apparatus shown in FIG. 3.

FIG. 5 is a plan view showing a state of real image reproduction by the hologram recording medium 220 thus created. The hologram recording medium 220 shown in FIG. 5 corresponds to the hologram photosensitive medium 222 (recording of hologram has been completed) shown in FIG. 4. However, the hologram recording medium 220 is inversely disposed with the upside down in the drawing. That is, in the process shown in FIG. 4, what the already recorded hologram photosensitive medium 222 is disposed with the upside down after the recording of hologram has been completed is the hologram recording medium 220 shown in FIG. 5.

As shown in FIG. 5, if the laser light having wavelength λ (the same wavelength as that of the illumination light L or the reference light Lr, which is used in the recording process in FIG. 4) is irradiated, as the illumination light for reproduction LL, from downwards of the hologram recording medium 220 at the incident angle ϕ, a hologram reproduction real image 235 of the scatter plate is produced upwards of the drawing. The hologram reproduction real image 235 is a reproduction image the original image of which is based on the scatter plate (opal glass plate) shown in FIG. 4.

The coherent light source (laser light source) 210 used in the apparatus shown in FIG. 3 is a light source to generate illumination light for reproduction LL, which is shown in FIG. 5, and the light source generates coherent light having the same wavelength λ as the wavelength of illumination light L and reference light Lr, which are used in the recording process of FIG. 4. Since the coherent light is subjected to change in terms of time by the time-changing-light-bending-device 215 as described above, the incident pattern of the coherent light into the hologram recording medium 220 is changed in terms of time. The reason why the incident pattern of the illumination light for reproduction LL is subjected to change in terms of time is to reduce speckles brought about on the screen. The basic principle thereof will be described in Section 4. Also, change conditions to efficiently reduce the speckles will be described in detail in Section 5.

Here, the time-changing-light-bending-device 215 functions to change the coherent light so that the incident light path of the coherent light into the hologram recording medium 220 cyclically fluctuates in the vicinity of a standard light path which is a light path of reference light Lr used when recording an image of the scatter plate on the hologram recording medium 220. In other words, using an ideal incident light path (the light path of the reference light Lr or the light path which becomes conjugate) to reproduce the hologram reproduction real image 235 as the standard light path, the actual incident light path is changed centering on the standard light path. Therefore, even if the incident light path of the coherent light to the hologram recording medium 220 is changed in terms of time, the hologram reproduction real image 235 can be obtained. As a matter of course, although the ideal condition to reproduce the hologram reproduction real image 235 is to accurately make the incident light path of the coherent light irradiated onto the hologram recording medium 220 agree with the standard light path, in the case of the present invention, the hologram reproduction real image 235 is not the image presented on the screen but a reproduction image of the scatter plate used for illumination, wherein it does not matter even if an ideal reproduction image is not obtained.

For example, since, in the hologram recording process shown in FIG. 4, the incident angle of reference light Lr is set to angle $\phi$, the ideal condition to obtain a hologram reproduction real image 235 of the scatter plate 230 using the hologram recording medium 220 created in such a process will be to irradiate the illumination light for reproduction at the angle $\phi$. However, if a predetermined small amount of change $\delta$ is determined and light is irradiated in the range of $\phi \pm \delta$, instead of accurately irradiating at the angle $\phi$, it is possible to obtain a hologram reproduction real image 235. As a matter of course, if the amount of change $\delta$ is increased, the brightness of the reproduction image will be reduced. However, in the case of the present invention, since the hologram reproduction real image 235 is a reproduction image of the scatter plate 230, there is no loss even if the brightness of the image is slightly lowered.

Finally, in FIG. 3, the hologram reproduction real image 235 will be obtained at an upward position of the hologram recording medium 220. In actuality, there may be a case where the medium material shrinks in the process of preparing the hologram recording medium 220. In such a case, taking the contraction of the material into consideration, it is preferable that the wavelength of the illumination light for reproduction LL is adjusted. Therefore, it is not necessary that the wavelength of the coherent light which is generated by the coherent light source 210 strictly agrees with the wavelength of the light used in the recording process in FIG. 4. It is sufficient that these wavelengths are roughly equal to each other. Also, in actual application, where laser light is utilized for illumination light, since it is difficult to adjust the wavelength, it is possible to correct the contraction of the material by adjusting the irradiation angle of light. In this case, when carrying out reproduction shown in FIG. 3 and when carrying out recording shown in FIG. 4, the incident angles $\phi$ of light to the recording medium 220 (the photosensitive medium 222) are made slightly different from each other.

An important feature of the present invention exists in that the spatial light modulator 240 is disposed so as to overlap on the generation position of the hologram reproduction real image 235. Here, although the spatial light modulator 240 is an existing device such as a liquid crystal micro-display or a DMD (Digital Micro-mirror Device), the hologram reproduction real image 235 is an optical reproduction image, wherein both may be disposed so as to overlap in the same space. Although only the existing spatial light modulator 240 is depicted in FIG. 3, the hologram reproduction real image 235 of the scatter plate, which is reproduced by the hologram recording medium 220, overlaps in the same space.

As a matter of course, the substance of the hologram reproduction real image 235 thus obtained is coherent light diffracted by interference fringes formed in the hologram recording medium 220, and the spatial light modulator 240 receives illumination by such coherent light and generates a predetermined modulated image. For example, where a transmission type liquid crystal micro-display is used as the spatial light modulator 240, a modulated image will be obtained as the contrast pattern of illumination light which has passed through the display.

The projection optical system 250 carries out a function of projecting a modulated image thus obtained on the spatial light modulator 240 on the screen 260. Where a transmission type liquid crystal micro-display is used as the spatial light modulator 240, the modulated image formed on the display is projected onto the screen 260 and the image is displayed.

<<<Section 3 Embodiment Showing a Detailed Configuration of Individual Elements and a Modified Version Thereof>>>

Subsequently, based on an apparatus according to an example experimentally produced by the present inventor, a description is given of a detailed configuration example of individual elements of a projection type image display apparatus shown in FIG. 3.

First, a DPSS (Diode Pumped Solid State) laser capable of emitting laser light the wavelength $\lambda$ of which is 532 nm (green) was used as the coherent light source 210. Since the DPSS laser is able to bring about comparatively high output laser light of a desired wavelength although it is small-sized, the DPSS laser is suitable as the coherent light source used for a projection type image display apparatus as in the present invention. In addition, any lens may be used as the magnification lens 211 and the collimate lens 212 if the lenses are capable of magnifying the light flux of laser light emitted from the DPSS laser and generating a parallel light flux.

On the other hand, the time-changing-light-bending-device 215 is a device which has a function of bending the coherent light at a predetermined bending angle in a predetermined bending direction, and has a function of changing at least one of the bending direction and the bending angle in terms of time. In detail, the time-changing-light-bending-device 215 may be composed by using a liquid crystal micro-display or a DMD (Digital Micro-mirror Device). As described above, the spatial light modulator 240 is also composed by using a liquid crystal micro-display or a DMD. Although the role of the spatial light modulator 240 resides in generation of a modulated image which becomes a projection object onto the screen 260, the role of the time-changing-light-bending-device 215 resides in bending the coherent light so that the bending pattern of the coherent light is changed in terms of time.

When the time-changing-light-bending-device 215 is composed by using a liquid crystal display, a diffraction grating pattern is displayed on the display, and the coherent light is to be bent by the diffraction phenomenon of light. Therefore, it is necessary that the liquid crystal display used has resolution required to display the diffraction grating pattern having a function of diffracting the coherent light. In detail, it is necessary to prepare a liquid crystal display having high resolution by which grating lines can be displayed at a pitch d from the order of the wavelength of light through several tens of micrometers (μm). Further, since the diffraction direction or the diffraction angle are changed in terms of time, a display controller will be required which can give electrical signals to the liquid crystal display so that the diffraction grating pattern being displayed is changed in terms of time.

When a transmission type liquid crystal display is used, the liquid crystal display is disposed at the position of the time-changing-light-bending-device 215 in FIG. 3 so that the coherent light composed of parallel light flux passed through the collimate lens 212 is caused to pass through the liquid crystal display. The coherent light is bent to a predetermined direction at a predetermined angle by a diffraction phenomenon based on the diffraction grating pattern displayed on the liquid crystal display. If the diffraction grating pattern is changed in terms of time by the display controller, the bending mode can be changed in terms of time. When a reflection type liquid crystal display is used, such an arrangement may be adopted by which the coherent light composed of parallel light flux passed through the collimate lens 212 is reflected by the liquid crystal display and is made incident into the hologram recording medium 220. The point that the bending mode is changed by the diffraction phenomenon in reflection in terms of time is the same as in the case where the transmission type liquid crystal display is used.

Figure 6A:
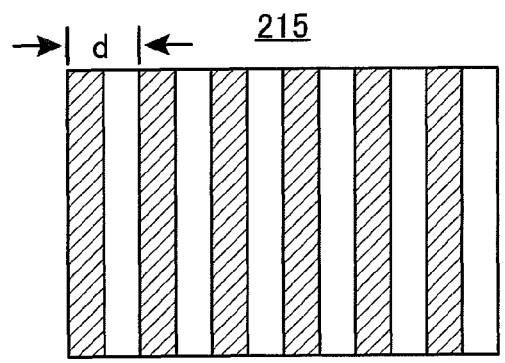
FIGS. 6A and 6B are plan views showing an example of changing the grating line pitch with respect to a diffraction grating pattern formed on the time-changing-light-bending-device 215 in the apparatus shown in FIG. 3.
Figure 6B:
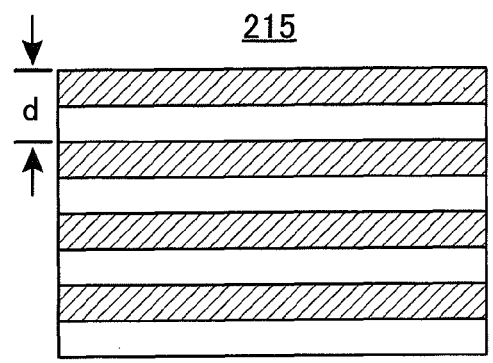

FIGS. 6A and 6B are plan views showing an example of changing the grating line pitch with respect to a diffraction grating pattern formed on the time-changing-light-bending-device 215, wherein FIG. 6A is an example in which a number of grating lines extending in the longitudinal direction are displayed at a pitch d on the screen of a liquid crystal display used as the time-changing-light-bending-device 215, and FIG. 6B is an example in which a number of grating lines extending in the horizontal direction are displayed at a pitch d. As described above, in actuality, since the pitch d is a value approximately equivalent to the order of the wavelength of light, the diffraction grating pattern cannot be observed with the naked eye. However, for convenience of the description herein, the diffraction grating pattern is illustrated as a white and black stripped pattern (black portions are shown by hatching) having widths which can be observed with the naked eye.

According to the diffraction condition, since the diffraction angle α is given by "d sin α=n λ" where the wavelength of light is λ, the grating line pitch is d, and the order of diffraction is n, it is possible to obtain a desired diffraction angle α calculated by the above-described equation if the grating line pitch d of the diffraction grating pattern being displayed is set to a predetermined value. Also, if the grating line pitch d is changed in terms of time, the diffraction angle α can be changed. Since the diffraction direction is the direction orthogonal to the grating lines, light is bent in the horizontal direction of the drawing if the grating lines of the longitudinal direction are displayed as shown in FIG. 6A, and light is bent in the longitudinal direction of the drawing if the grating lines of the horizontal direction are displayed as shown in FIG. 6B. Finally, if the display controller controls so as to cyclically increase and decrease the pitch d of the grating lines which compose the diffraction grating pattern, the bending angle α of the coherent light is changed in terms of time, wherein diffracted coherent light is caused to oscillate in the direction orthogonal to the grating lines.

Figure 7:
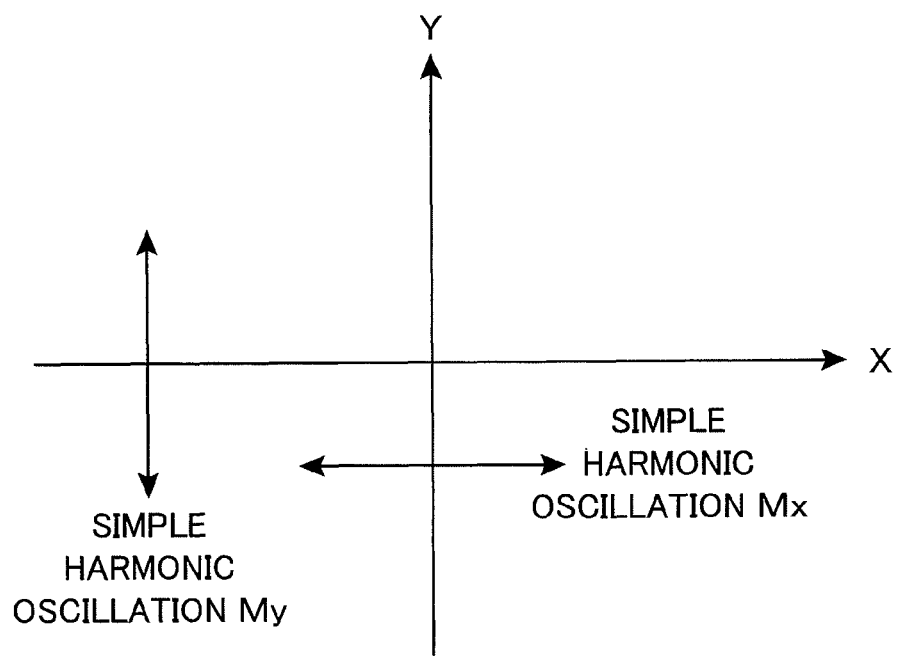
FIG. 7 is a plan view showing a moving mode on the hologram recording medium 220 of the coherent light beam which is diffracted by the diffraction grating pattern being changed as shown in FIGS. 6A and 6B.

FIG. 7 is a plan view showing a moving mode on the hologram recording medium 220 of the diffracted coherent light beam where the pitch d of the grating lines of the longitudinal direction or the grating lines of the horizontal direction is changed as shown in FIGS. 6A and 6B. Here, as illustrated, it is assumed that an XY two-dimensional orthogonal coordinate system is defined in which the right-hand direction of the drawing is the X-axis, and the upward direction of the drawing is the Y-axis, and the coordinate system is disposed so that the recording surface of the hologram recording medium 220 is included in the XY-plane. In this case, if the pitch d of the grating lines of the longitudinal direction as shown in FIG. 6A is cyclically increased and decreased, the diffracted coherent light beam oscillates along the X-axis direction as shown by the arrow Mx on the hologram recording medium 220, and if the pitch d of the grating lines of the horizontal direction as shown in FIG. 6B is cyclically increased and decreased, the diffracted coherent light beam oscillates along the Y-axis direction as shown by the arrow My.

As a matter of course, it is possible to cause the diffracted coherent light beam to oscillate in any optional direction other than the X-axis direction and the Y-axis direction. In any case, if the coherent light is set so as to be made incident under the ideal incident condition (that is, under the same incident condition as the reference light used when recording a hologram) to reproduce the hologram recording medium 220 when the light beam comes at the center position of the oscillation, the light path of the coherent light will be cyclically moved in the vicinity of the standard light path by which the ideal reproduction condition is given, the hologram reproduction real image 235 of the scatter plate can be reproduced in a state close to the ideal.

Figure 8:
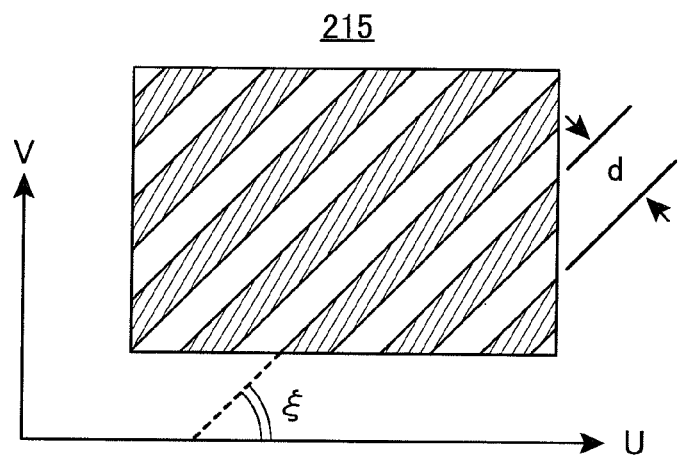
FIG. 8 is a plan view showing an example in which the direction of the grating lines is changed with respect to the diffraction grating pattern formed on the time-changing-light-bending-device 215 in the apparatus shown in FIG. 3.

FIG. 8 is a plan view showing an example in which the direction of the grating lines of the diffraction grating pattern formed on the time-changing-light-bending-device 215 is changed. As illustrated, where a UV coordinate system is defined on the pattern-forming surface, a number of grating lines are disposed at the pitch d in a direction that forms a predetermined angle ξ to the U axis. Here, if the disposition angle ξ is changed even if the value of the pitch d is fixed, the diffraction direction becomes the direction orthogonal to the grating lines, and light is changed in the bending direction. Therefore, if the display controller controls to change the direction (the disposition angle ξ) of the grating lines that compose the diffraction grating pattern, the bending direction of the coherent light is changed in terms of time, and the light path of the diffracted coherent light can be cyclically moved along the conical surface.

Figure 9:
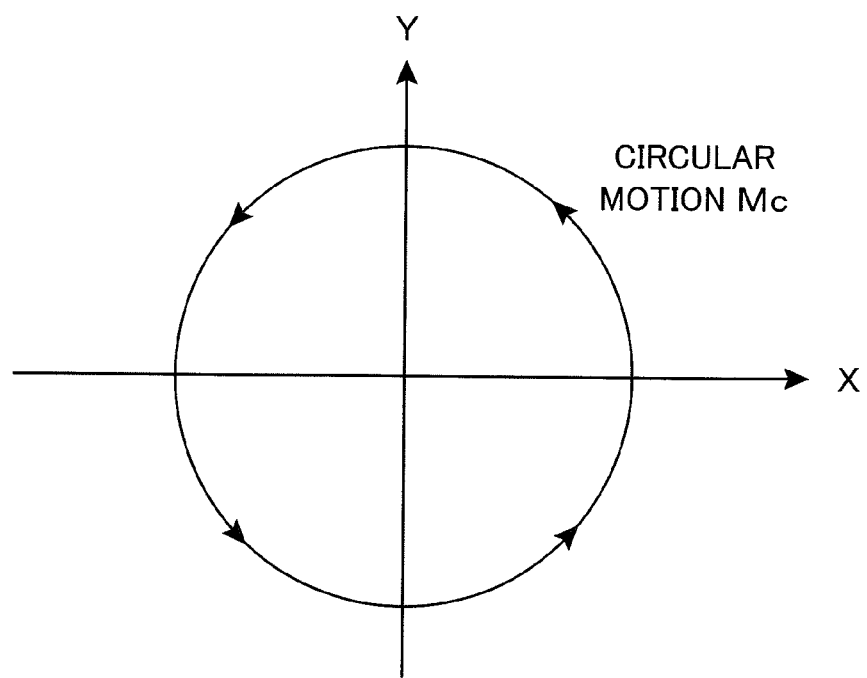
FIG. 9 is a plan view showing a moving mode on the hologram recording medium 220 of the coherent light beam which is diffracted by the diffraction grating pattern being changed as shown in FIG. 8.

FIG. 9 is a plan view showing a moving mode of the diffracted coherent light beam on the hologram recording medium 220 when the disposition angle ξ is changed in a state where the pitch d of the grating lines is fixed, as shown in FIG. 8. Here, it is also assumed that, as illustrated, the XY coordinate system is defined, and the recording surface of the hologram recording medium 220 is disposed so as to be included in the XY-plane. In this case, if an operation of gradually changing the disposition angle ξ from 0 to 360 degrees is repeatedly made, the diffracted coherent light beam will move along the circular orbit or elliptical orbit shown by the arrow Mc on the hologram recording medium 220. As illustrated, the circular orbit is brought about when the central axis of a cone which is depicted by the moving orbit of the light path of coherent light is orthogonal to the recording surface of the hologram recording medium 220. When both are not orthogonal to each other, the coherent light beam depicts an elliptical orbit on the hologram recording medium 220.

Here, the radius of the circular motion Mc is determined depending on the pitch d of the grating lines. Therefore, if both the grating line pitch d and the disposition angle ξ are changed in terms of time, the coherent light beam will depict a further complicated moving orbit on the hologram recording medium 220. That is, if the display controller carries out control by which the bending angle of the coherent light is changed in terms of time by cyclically increasing and decreasing the pitch d of the grating lines of the diffraction grating pattern and by which the bending direction of the coherent light is changed in terms of time by changing the direction of the grating lines of the diffraction grating pattern, the diffracted coherent light will make a cyclic motion while having a motion component by which the diffracted coherent light oscillates in the direction orthogonal to the grating lines and a motion component by which the light path thereof cyclically moves along the conical surface.

As described above, although a description was given of the example in which the time-changing-light-bending-device 215 is composed by using a liquid crystal display, it is possible to compose the time-changing-light-bending-device 215 by using a digital micro-mirror device. In this case, the time-changing-light-bending-device 215 is provided with a direction controller, which gives electrical signals to control the direction of individual mirrors to the digital micro-mirror device, along with the digital micro-mirror device, and the coherent light generated by the coherent light generating unit is bent by reflection based on the digital micro-mirror device. Since the directions of the individual mirrors which compose the digital micro-mirror device are controlled by the direction controller, it becomes possible to reflect the light incident into the respective positions to any optional directions.

As shown in FIG. 7, on the hologram recording medium 220, in order to cause the coherent light beam to oscillate in a predetermined direction, the direction controller may control to give electrical signals to cause the normals of the individual mirrors of the digital micro-mirror device to oscillate on the oscillation surface parallel to the predetermined reference plane. Thereby, the bending angle of the coherent light is changed in terms of time, and the reflected coherent light can be oscillated on the oscillation surface.

Also, as shown in FIG. 9, in order to cause the coherent light beam to make a circular motion or an elliptical motion on the hologram recording medium 220, the direction controller may control to give electrical signals to cause the normals of the individual mirrors of the digital micro-mirror device to cyclically move along a predetermined conical surface (the center axes of cones in regard to the individual mirrors are made parallel to each other). Thereby, the bending direction of the coherent light is changed in terms of time, and the light path of the reflected coherent light can be cyclically moved along the conical surface.

As a matter of course, it is possible to carry out further complicated motions by combining these motions. That is, if the direction controller controls to give electrical signals to make cyclical motions based on a motion component to cause the normals of the individual mirrors of the digital micro-mirror device to oscillate on the oscillation surface parallel to a predetermined reference plane and a motion component to cause the same to cyclically move along a predetermined conical surface, both of the bending direction and the bending angle of the coherent light can be changed in terms of time.

As described above, a description was given of the example in which the time-changing-light-bending-device 215 is composed by using a liquid crystal display or a digital micromirror device. However, as long as the time-changing-light-bending-device 215 according to the present invention is a device having a function of bending coherent light by a predetermined bending angle in a predetermined direction and a function of changing at least one of the bending direction and the bending angle in terms of time, the device may be composed by using a spatial light modulator other than the liquid crystal display and the digital micro-mirror device, such as an LCOS (Liquid Crystal On Silicon), etc., in addition thereto.

Further, in the above-mentioned embodiment, an example of displaying an image of a diffraction grating pattern on the spatial light modulator was described. However, a diffraction grating pattern is not necessarily used as long as the function of bending coherent light is provided. For example, it does not matter that a phase data pattern such as a Fourier transformation hologram or a Fresnel hologram, etc., is displayed.

Subsequently, a description will be given of a detailed configuration of the hologram recording medium 220. As already described, the hologram recording medium 220 was created by the hologram recording process shown in FIG. 4. An opal glass plate (generally available on the market as an optical diffusing plate) the plane size of which is slightly larger than the spatial light modulator 240 is used as the scatter plate 230 that becomes an original image. Also, in order to generate illumination light L and reference light Lr, which are used in the recording process of a hologram, a DPSS laser capable of emitting laser light the wavelength $\lambda$ of which is 532 nm (green) described above was used.

Finally, the coherent light source 210 which functions as a unit for generating coherent light is a light source for generating coherent light of the same wavelength as the wavelength of light used when recording an image of the scatter plate 230. And, the hologram recording medium 220 shown in FIG. 3 is disposed so that the standard light path (the average light path of a light path changing in terms of time) of the coherent light to the hologram recording medium 220 agrees with the incident light path (or the light path conjugate therewith) of the reference light Lr used when recording the image of the scatter plate 230. The incident light path of the coherent light with respect to the hologram recording medium 220 changes in terms of time centering on the standard light path.

Here, it is preferable that a volume hologram using a photopolymer is used as the hologram recording medium 220. Generally, a hologram utilized as a falsification preventing seal in a cash card, a cash voucher, etc., is called a relief (embossed) hologram, in which hologram interference fringes are recorded as a surface relief structure. However, in the case of the relief hologram, since there is a possibility for scattering based on the surface relief structure to become a new factor for speckle generation, the relief hologram is not suitable for utilization in a projection type image display apparatus as in the present invention. Since, in the volume hologram, hologram interference fringes are recorded as distribution of refractive indexes in the interior of the medium, there is no case where the volume hologram is influenced by scattering based on the surface relief structure.

As a matter of course, even if a volume hologram is of such a type in which recording is carried out by utilizing a photosensitive medium including silver halide material, there is a possibility for scattering based on silver halide particles to become a new factor for speckle generation. Therefore, it is preferable to avoid use of such a volume hologram. Based on such a reason, the present inventor considers that a volume hologram using a photopolymer is most suitable as the hologram recording medium 220 utilized for the present invention. A detailed chemical composition of such a volume hologram using photopolymer is exemplarily shown in Japanese Patent Publication No. 2849021.

In addition, the embodiment shown in FIG. 3 shows an example of a transmission type hologram recording medium 220 which generates a hologram reproduction real image by transmitting illumination light for reproduction. However, it does not matter that a reflection type hologram recording medium which generates a hologram reproduction real image by reflecting illumination light for reproduction is used. In this case, it is sufficient that the coherent light source 210, the magnification lens 211 and the collimate lens 212 are disposed so that illumination light for reproduction is irradiated obliquely upwards of the hologram recording medium 220 shown in FIG. 3.

In addition, although, in the embodiment shown in FIG. 3, the light source 210, the lenses 211, 212 and the time-changing-light-bending-device 215 are disposed obliquely downward with respect to the hologram recording medium 220, these members may be disposed at any positions such as a position right below the hologram recording medium 220, if such a mechanism can be taken so that the illumination light for reproduction is made incident into the hologram recording medium 220 in a direction suitable for reproduction of hologram.

In addition, although, in the recording process shown in FIG. 4, a so-called Fresnel type hologram recording medium is created, it does not matter that a Fourier transformation type hologram recording medium, which is obtained by carrying out recording using lenses, is created. However, where the Fourier transformation type hologram recording medium is used, lenses will be required when reproducing the image.

On the other hand, as described above, the transmission type liquid crystal micro-display was used as the spatial light modulator 240. With this display, since it is possible to control the transmission ratio of light for individual pixels by changes in phase of liquid crystal based on electrical signals, it is possible to generate a modulated image in accordance with given image data on the displaying surface of the display. Further, although the reflection type liquid crystal micro-display may be used as the spatial light modulator 240, in this case, it is necessary to adopt a configuration in which light from the hologram recording medium 220 is made incident into the spatial light modulator 240 from obliquely upwards in the drawing.

As a matter of course, the spatial light modulator 240 which can be utilized in the present invention is not limited to a liquid crystal micro-display, and it does not matter that elements such as a DMD (Digital Micro-mirror Device) and LCOS (Liquid Crystal on Silicon), etc., are used.

If the projection optical system 250 is an optical system having a function of projecting a modulated image, which is obtained on the spatial light modulator 240, onto the screen 260, it does not matter which type of optical system is used. Usually, the projection optical system 250 is composed of a plurality of lenses so as to adjust the focal distance. Further, although the illustrated example is a forward projection type apparatus by which an image is observed with the viewpoint E placed at this side of the screen 260, a rearward projection type apparatus (a so-called rear projection apparatus) for observing an image with the viewpoint E placed at the other side of the screen 260 may be utilized as the projection type image display apparatus according to the present invention.

However, generally, with the rear projection type apparatus, it is possible to control generation of speckles by devising the material of the screen. That is, in the case of the rear projection type apparatus, since the light which can be observed by an observer becomes light transmitted through the screen, it is possible to cope with generation of speckles by applying a measure in which scattering particles are embedded in the screen. Therefore, in actual application, a technology for reducing speckles according to the present invention can exert full performance in a forward projection type apparatus which carries out forward projection for projecting a modulated image to the observation surface of the screen.

<<<Section 4. Advantages of the Present Invention>>>

Figure 10:
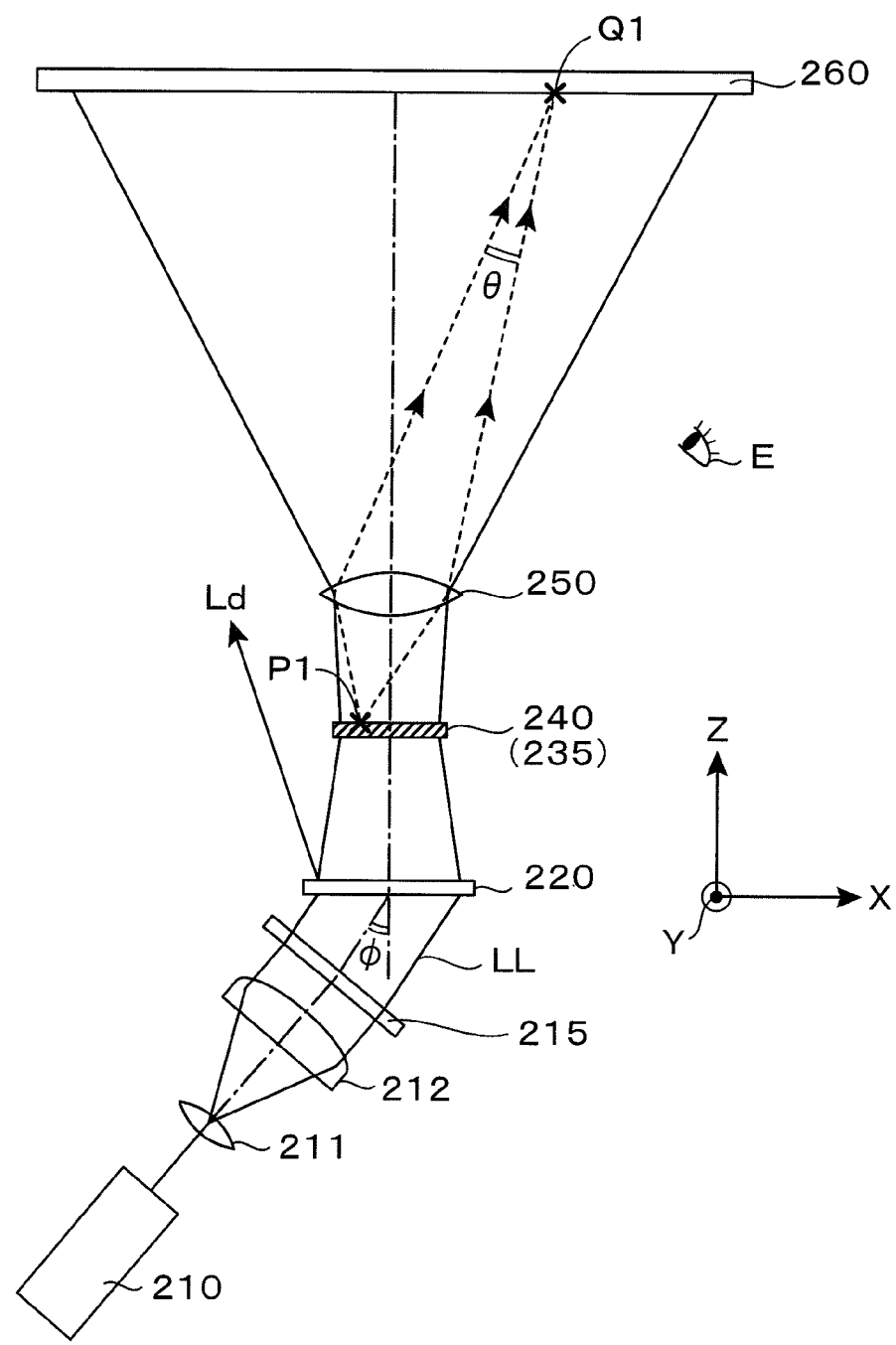
FIG. 10 is a plan view showing an advantage of producing the hologram reproduction real image 235 of the scatter plate by the hologram recording medium 220 in the apparatus shown in FIG. 3.

In this section, a description is given of advantages of the present invention with respect to a prior art apparatus exemplarily shown in FIG. 1. Now, FIG. 10 is a plan view to show the advantages of the embodiment shown in FIG. 3. The configuration itself of the apparatus shown here is identical to the configuration of the apparatus shown in FIG. 3. Here, a description is given by comparing the prior art apparatus shown in FIG. 2 with the apparatus according to the embodiment shown in FIG. 10.

As described in Section 1, the first problematic point of the prior art apparatus shown in FIG. 2 resides in that a part of the laser light irradiated onto the scatter plate 120 is wasted without contributing to image display as exemplarily shown as the scattered light Ls. On the contrary, in the apparatus shown in FIG. 10, there is no case where any wasteful scattered light Ld as illustrated is brought about. This is because, as shown in FIG. 5, the light which has passed through the hologram recording medium 220 is diffracted to the direction of forming the hologram reproduction real image 235. Since the hologram recording medium 220 itself is not a scatter plate which scatters the incident light at random, any wasteful light oriented in the direction along which any reproduction image is not produced is not generated like the illustrated scattered light Ld. Therefore, the entire light irradiated on the hologram recording medium 220 will be effectively utilized in order to form a hologram reproduction real image 235.

The second problematic point of the prior art apparatus shown in FIG. 2 resides in that a large-scaled rotation mechanism to rotate the scatter plate 120 is required, and this hinders downsizing of the apparatus. On the contrary, in the case of the apparatus shown in FIG. 10, as the time-changing-light-bending-device 215 can be realized by using a relatively small sized device such as a liquid crystal display or a DMD, it is easy to downsize the apparatus. Further, power consumption can be reduced because required electric power to drive a liquid crystal display or a DMD is absolutely smaller than that to rotate the scatter plate 120.

And, the third problematic point of the prior art apparatus shown in FIG. 2 resides in that, although speckles resulting from the light source side of illumination light can be reduced by rotating motions of the scatter plate 120, speckles resulting from the screen side cannot be reduced sufficiently.

As described with respect to FIG. 2, since the spatial light modulator 140 is not a scatter plate, pixel information of the image point P1 is projected to the projection point Q1 on the screen 160 by the projection light L1 as it is, and when the projection optical system 150 is observed from the projection point Q1, the direction along which the projection light L1 is made incident into the projection point Q1 is always fixed. Thus, if the coherent light is irradiated from the same direction with respect to the surface of the screen 160 at all times, this becomes a large factor by which speckles are brought about.

On the contrary, in the apparatus shown in FIG. 10, a hologram reproduction real image 235 of the scatter plate is formed so as to overlap on the spatial position of the spatial light modulator 240. Accordingly, the light made incident into respective points on the spatial light modulator 240 will have already been multiplexed with respect to the angle. That is, as shown in FIG. 5, the respective points of the hologram reproduction real image 235 of the scatter plate will be composed of light coming from various points of the hologram recording medium 220. For this reason, the speckles at the light source side will disappear at this stage.

Further, since the hologram reproduction real image 235 of the scatter plate is formed so as to overlap on the spatial light modulator 240, the light from a modulated image formed on the spatial light modulator 240 carries out a behavior just like the behavior of the scattered light emitted from the scatter plate. Therefore, the pixel information of the image point P1 shown in FIG. 10 spreads as the information of the scattered light oriented in various directions, and is imaged at the projection point Q1 on the screen 260 by means of the lenses that compose the projection optical system 250. Here, the optical paths of the scattered light oriented from the image point P1 to the projection point Q1 are diversified (in the drawing, two optical paths are illustrated by a dotted line), and when the projection optical system 250 is observed from the projection point Q1, the incident angles of light incident into the projection point Q1 are diversified.

Finally, if the optical paths of incident light which are incident from various directions are bundled with respect to a specified projection point Q1, a conical body the top of which is the corresponding projection point Q1 will be formed. Here, the vertex angle θ of a triangle obtained by cutting the corresponding conical body along the center axis is generally called the "distribution angle of incident light." The angle θ formed by the optical path shown by a dotted line in FIG. 10 is the distribution angle of incident light with respect to the projection point Q1. The distribution angle of incident light θ takes different values for individual projection points, wherein generally the angle will become greater toward the center of the screen 260, and will become smaller toward the end parts of the screen 260.

The distribution angle of incident light θ at a specified projection point Q1 becomes a parameter showing the degree of multiplexing of the incident angle of light incident into the corresponding projection point Q1. The greater the distribution angle of incident light θ is, the greater the degree of multiplexing of the incident angle becomes, wherein light will be incident from further various directions in line therewith. And, the degree of multiplexing of the incident angle has a close relationship with a factor for speckle generation. That is, as described in "Speckle Phenomena in Optics" by Joseph W. Goodman, Roberts & Company Publishers 2006, if the degree of multiplexing of the incident angle is increased, generation of speckles can be accordingly reduced. Therefore, with respect to any projection point on the screen 260, if the distribution angle of incident light θ is increased as much as possible, generation of speckles is reduced.

Although the value of the actual distribution angle of incident light θ is determined based on the characteristics (particularly, the size of modulated image generating surface) and arrangement of the spatial light modulator 240, the characteristics (particularly, the aperture diameter and focal distance of lens) and arrangement of the projection optical system 250, and the characteristics (particularly, the scatter characteristics of size and scatter angle, which are determined in accordance with the positional relationship between the maximum take-in diameter of the projection lens and the light valve in the projection optical system 250) of the scatter plate 230 recorded in the hologram recording medium 220, the apparatus according to the present invention is able to further increase the distribution angle of incident light θ with respect to an optional projection point on the screen 260 in comparison with the apparatus proposed by the prior arts. This is because the hologram reproduction real image 235 of the scatter plate is formed so as to overlap on a spatial position of the spatial light modulator 240 as shown in FIG. 10.

As described above, if the apparatus configuration according to the present invention is adopted, light from a modulated image formed on the spatial light modulator 240 will carry out a behavior just like that of the scattered light emitted from the scatter plate, wherein the image information of the illustrated image point P1 is spread as the information of scattered light oriented toward various directions. In the illustrated example, the reason why the distribution angle of incident light θ is obtained with respect to the projection point Q1 is that the scattered light oriented to various directions from the image point P1 is condensed at the projection point Q1 by the projection optical system 250. Thus, the feature that "a hologram reproduction real image 235 of the scatter plate is formed so as to overlap on the position of the spatial light modulator 240" in the present invention carries out a remarkably important function in view of reducing speckles resulting from the screen side.

In addition thereto, the apparatus shown in FIG. 10 is provided with another device by which speckles resulting from the screen side are further reduced. The device is a mechanism for changing the incident mode of illumination light for reproduction, which is given to the hologram recording medium 220, in terms of time by means of time-changing-light-bending-device 215. As described above, in the present invention, since the hologram reproduction real image 235 of the scatter plate is formed so as to overlap on the position of the spatial light modulator 240, a greater distribution angle of incident light θ than that of the prior art apparatus can be secured, wherein, although an effect of reducing speckles can be obtained, the effect of reducing speckles can be further increased by changing the incident mode of illumination light for reproduction in terms of time by using the time-changing-light-bending-device 215.

Figure 11:
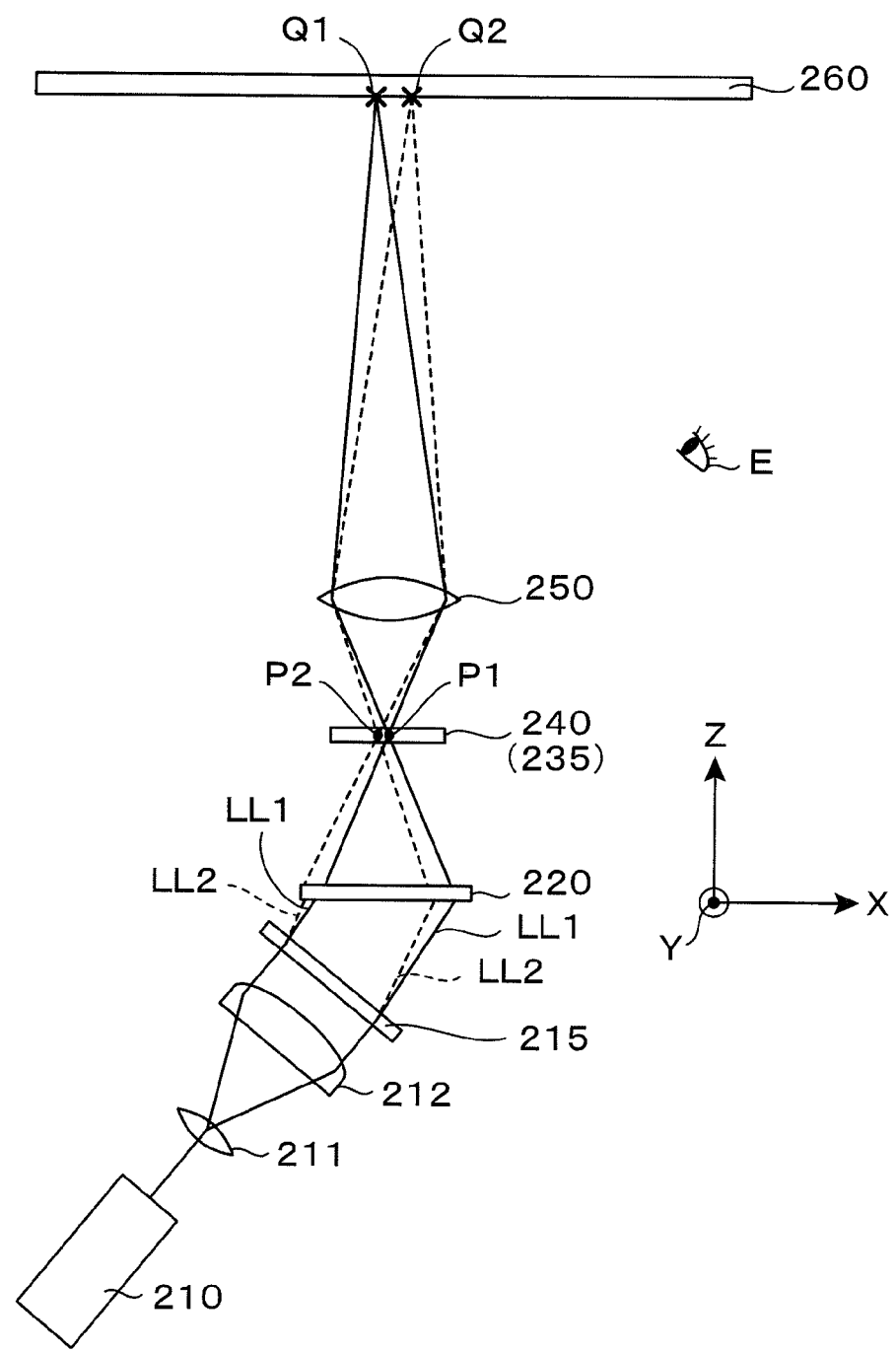
FIG. 11 is a plan view showing an advantage of a changing operation of the time-changing-light-bending-device 215 in the apparatus shown in FIG. 3.

FIG. 11 is a plan view showing the reason why the speckle reducing effect is obtained by changing operation of the time-changing-light-bending-device 215. In FIG. 11, two types of the light path illustrated by a solid line and the light path illustrated by a broken line are shown with respect to the coherent light passed through the time-changing-light-bending-device 215. This shows two light paths in which the bending states differ from each other by the time-changing-light-bending-device 215. In other words, the first point of time at which the light path shown by a solid line is obtained and the second point of time at which the light path shown by a broken line is obtained are different from each other. That is, the light emitted from the coherent light source 210 reaches the screen 260, passing through the light path shown by a solid line at a certain point in time, and reaches the screen 260, passing through the light path shown by a broken line at another point in time.

The light path shown by a solid line of the drawing shows that the illumination light LL1 bent by the time-changing-light-bending-device 215 is diffracted by interference fringes (information of the scatter plate) on the surface of the hologram recording medium 220, and is condensed at the projection point Q1 by the projection optical system 250 after having illuminated a predetermined image point P1 on the spatial light modulator 240. Similarly, the light path shown by a broken line of the drawing shows that the illumination light LL2 bent by the time-changing-light-bending-device 215 is diffracted by interference fringes (information of the scatter plate) on the surface of the hologram recording medium 220 and is condensed at the projection point Q2 by the projection optical system 250 after having illuminated a predetermined image point P2 on the spatial light modulator 240. The discrepancy between the image points P1 and P2 corresponds to discrepancy in the reproduction position of the hologram reproduction real image 235 of the scatter plate.

Here, since the pixel information of image point P1 is always projected onto the projection point Q1, and the pixel information of image point P2 is always projected onto the projection point Q2, the image itself projected onto the screen 260 is constant regardless of a change in terms of time by the time-changing-light-bending-device 215. However, focusing on the behavior of a specified light beam emitted from the coherent light source 210, since, at a certain point in time, the coherent light beam is bent by the time-changing-light-bending-device 215 as the illumination light LL1, and is condensed on the projection point Q1 on the screen 260, at another point in time, the coherent light beam is bent by the time-changing-light-bending-device 215 as the illumination light LL2, and is condensed at the projection point Q2 on the screen 260. That is, the corresponding specified light beam will have scanned on the screen 260 from the projection point Q1 to the projection point Q2.

Thus, if the bending state by the time-changing-light-bending-device 215 is changed in terms of time, a specified light beam emitted from the coherent light source 210 is caused to scan on the screen 260. Since such scanning is scanning of a light beam functioning as just the illumination light, it does not cause any change with respect to the image projected on the screen 260. For example, according to the light path depicted by a solid line in FIG. 11, the light beam of the illumination light LL1 is projected onto the projection point Q1, but, at the next moment, another light beam will be projected onto the projection point Q1. However, there is no change in that the information projected onto the projection point Q1 is the pixel information of the image point P1 at all times.

If the light beam is caused to scan on the screen 260, the speckle reducing effect is obtained. This is because, since factors of speckles are moved on the screen 260 along with scanning by the light beam, the speckle patterns are integrated in terms of time, wherein the factors will be hardly recognized. Describing this from another point of view, if the bending state by the time-changing-light-bending-device 215 is changed in terms of time, the incident state of illumination light for reproduction in regard to the hologram recording medium 220 is changed, and the position at which the reproduction real image 235 of the scatter plate is formed is changed. On the other hand, since the pixel (the pixel of the spatial light modulator 240) of the image point P1 remains still, there is no change in the modulated image information given to the image point P1. However, since the position of the reproduction real image 235 of the scatter plate, which is reproduced so as to overlap on the position of the image point P1, is changed, the scattering phenomenon at the image point P1 will be changed in terms of time. Therefore, the characteristics of the scattered light directed from the image point P1 toward the projection point Q1 is changed in terms of time, and the scattering phenomenon occurring at the projection point Q1 is also changed in terms of time, and will be multiplexed in terms of time. Thus, speckles resulting from scattering occurring at the projection point Q1 are reduced.

<<<Section 5. Optimum Numerical Value Conditions>>>

Subsequently, herein, the optimum numerical conditions in view of carrying out the basic embodiment described in Section 2 are shown. First, in order to search for what important factors are in view of reducing speckles in the projection type image display apparatus according to the present invention, the experimental results made by the present inventor are presented.

Figures 12, 13:
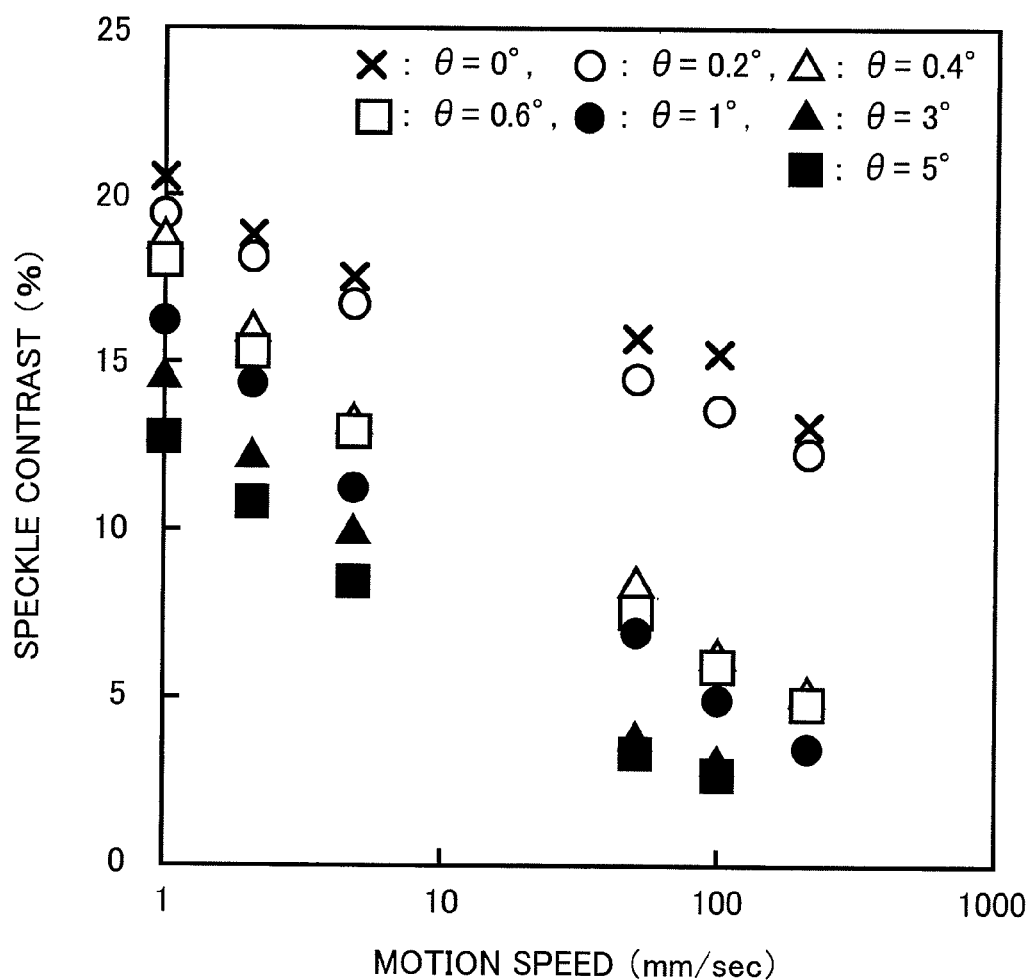
FIG. 12 is a table showing the degree of generation of speckles where experiments are carried out under various conditions.
FIG. 13 is a graph showing experimental results of the degree of generation of speckles where the distribution angle of incident light θ and linear speed of light flux scanning are used as parameters.

FIG. 12 is a table showing the degree of generation of speckles where experiments were carried out under various conditions. "Speckle Phenomena in Optics" by Joseph W. Goodman, Roberts & Company Publishers 2006 proposed a method of using numerical values called speckle contrasts (unit: %) as parameters showing the degrees of speckles brought about on the screen. The speckle contrast is defined as a numerical value obtained by dividing the standard deviations in brightness unevenness actually produced on the screen by the average value of the brightness when displaying a test pattern image which takes an original uniform distribution in brightness. This means that the greater the value of the speckle contrast becomes, the greater the degree of speckle generation on the screen is, wherein it shows that a spot-like brightness unevenness pattern is further remarkably presented to an observer.

The table of FIG. 12 shows the results of having measured speckle contrasts with respect to three types of conditions, utilizing the apparatus configuration shown in FIG. 3. First, the measurement result shown as condition 1 is a result in the case where a green-color laser was used as the light source 210, any changing factor and any diffusing element are not provided between the light source 210 and the spatial light modulator 240. In summary, the result is based on the measurement made by a measurement system in which the time-changing-light-bending-device 215 and the hologram recording medium 220 were removed from the apparatus shown in FIG. 3, and a parallel light flux emitted from the collimate lens 212 was irradiated as is to the spatial light modulator 240. In this case, as shown in the table, the speckle contrast of 20.7% was obtained as the measurement result. This is a state where a spot-like brightness unevenness pattern is considerably remarkably observed when being observed with the naked eye.

On the other hand, the measurement result shown as condition 2 is a result of the measurement made by a measurement system in which the time-changing-light-bending-device 215 was removed and a parallel light flux emitted from the collimate lens 212 was utilized as is as illumination light for reproduction of the hologram recording medium 220 in the apparatus configuration shown in FIG. 3. That is, this is the result of measurement where, although the green-color laser is used as the light source and the hologram recording medium 220 functioning as a diffusing element is disposed between the light source 210 and the spatial light modulator 240, the incident mode (the incident direction and the incident angle) of coherent light used as the illumination light for reproduction is not changed in terms of time but is maintained to be constant (the result of measurement in the case where the incident mode of coherent light was changed in terms of time by the time-changing-light-bending-device 215 is shown in the graph of FIG. 13 as described later). In addition, in the measurement, the condition was set by which the distribution angle of incident light θ becomes 10 degrees or more at any point on the screen 260. In this case, as shown in the table, the speckle contrast of 17.9% was obtained as the measurement result. This is a state where a spot-like brightness unevenness pattern can be still observed when being observed with the naked eye.

On the contrary, the measurement result shown as condition 3 is a result in the case where, in the apparatus shown in FIG. 3, the light source 210 was replaced with a green-color LED (non-coherent light source), and any changing element and any diffusing element are not provided between the LED and the spatial light modulator 240 (that is, where the time-changing-light-bending-device 215 and the hologram recording medium 220 were removed). In this case, as shown in the table, the speckle contrast of 4.0% was obtained as the measurement result. This is a remarkably favorable state where the brightness unevenness pattern is hardly observed when being observed with the naked eye.

The reason why the measurement result according to the condition 3 showed a remarkably favorable result in comparison with the measurement results according to the conditions 1 and 2 is that the "non-coherent light source (LED)" was used as the light source. As already described above, in actual application, a problem of speckle generation is inherent to a case where the "coherent light source" such as a laser is used. The problem of speckle generation is a matter which is not required to be taken into consideration in an apparatus using a "non-coherent light source" such as a LED. Therefore, ideally, in an apparatus in which a "coherent light source" such as a laser is used, it is preferable that the speckle contrast is obtained which is similar to that of an apparatus using a "non-coherent light source."

Actually, in a case of usage for image display in HDTV (High-Definition Television), such a standard has been shown that the speckle contrast is 6.0% or less as the level at which a brightness unevenness pattern is hardly recognizable when an observer observes images with the naked eye (for example, refer to Patent Publication No. WO/2001/081996). Therefore, in an apparatus using a "coherent light source" such as a laser, it is one of the technical objects to reduce the speckle contrast to 6.0% or less.

According to the measurement result of FIG. 12, in the apparatus shown in FIG. 3, the speckle contrast could be reduced only by 2.8 points by providing a hologram recording medium 220 functioning as a diffusing element (condition 1 to condition 2). Indeed, although it is successful that the speckle is reduced to a certain extent by intervening the hologram recording medium 220, the result in which the speckle contrast is 17.9% is not a result that is satisfactory in actual applications.

Thus, the reason why the speckle contrast cannot be sufficiently reduced only by intervention of the hologram recording medium 220 is that, although speckles resulting from the light source side of the illumination light can be reduced, the speckles resulting from the screen side cannot be sufficiently reduced. In an apparatus according to the basic embodiment of the present invention, which is shown in FIG. 3, the following two approaches are taken in order to attempt to reduce the speckles.

The first approach is to secure a distribution angle of incident light θ at respective projection points. In the case of the prior art apparatus, the path of light incident into the projection point Q1 shown in FIG. 2 is only one, and the distribution angle of incident light θ is 0 degree. Therefore, it is not possible to attempt to reduce the speckles resulting from the screen side. On the contrary, in the case of the apparatus according to the present invention, scattered light from the image point P1 gathers through various optical paths at the projection point Q1 shown in FIG. 10, wherein it becomes possible to secure a distribution angle of incident light θ to a certain extent.

The second approach is a change motion by the time-changing-light-bending-device 215. As described above, the time-changing-light-bending-device 215 has a function of bending the coherent light, which is generated by the coherent light generating unit, at a predetermined bending angle in a predetermined bending direction, and a function of changing at least one of the bending direction and the bending angle in terms of time. It has been already described that, based on such a change, the illumination light for reproduction, which is given to the hologram recording medium 220, is caused to oscillate as shown in FIG. 7 on the recording surface of the hologram recording medium 220 or to make a circular motion (or an elliptical motion) as shown in FIG. 9, wherein the incident direction or the incident angle change. That is, the irradiation direction (an azimuth of a projected light beam which is orthographically projected onto the hologram recording surface) of the illumination light for reproduction given to the hologram recording medium 220 and the irradiation angle (an incident angle of a light beam into the hologram recording surface) thereof are changed in terms of time.

Here, focusing on a single particular light beam emitted from a specified point of the time-changing-light-bending-device 215, the particular light beam will pass through a predetermined point on the spatial light modulator 240 and reach a predetermined projection point on the screen 260 after being diffracted by the hologram recording medium 220. However, since the direction of the particular light beam directed from the specified point of the time-changing-light-bending-device 215 toward the hologram recording medium 220 changes in terms of time, the final reach point of the particular light beam (the projection point on the screen 260) also moves, and scans on the screen 260 (for example, in the case of the example of FIG. 11, the point moves from the projection point Q1 to the projection point Q2).

In detail, as in the example shown in FIG. 7, if the light beam is caused to oscillate in a predetermined axial direction on the hologram recording medium 220, the projection point of the light beam also oscillates on the screen. As in the example shown in FIG. 9, if the light beam is caused to make a circular motion on the hologram recording medium 220, the projection point of the light beam will make a circular motion on the screen. Thus, the reason why speckles resulting from the screen side can be reduced by causing light to scan on the screen 260 is that the speckle patterns will be integrated in terms of time by light flux scanning.

Therefore, using the apparatus according to the present embodiment shown in FIG. 3, the present inventor examined how much the first approach (securing of the distribution angle of incident light θ) and the second approach (light flux scanning) contribute to a reduction in speckle contrasts. The results thereof are shown in the graph of FIG. 13. The graph shows experimental results showing the degree of generation of speckles (that is, the speckle contrasts) where the distribution angle of incident light θ and linear speed of light flux scanning are used as parameters under the premise that the apparatus is actuated in a state where the time-changing-light-bending-device 215 and the hologram recording medium 220 are inserted.

The ordinate of the graph is the speckle contrast value (unit: %) obtained with respect to an image displayed on the screen 260. On the other hand, the motion speed shown on the abscissa of the graph is a motion speed of light used for scanning on the screen 260. The experiment was carried out by using a liquid crystal display as the time-changing-light-bending-device 215, displaying the diffraction grating pattern as shown in FIG. 8 on the display surface, and changing the grating line disposition angle ξ in the range from 0 to 360 degrees. The mutual arrangement of the time-changing-light-bending-device 215 (liquid crystal display) and the hologram recording medium 220 was determined so that the light beam carries out a circular motion on the recording surface of the hologram recording medium 220 as shown in FIG. 9. Therefore, the light beam used for scanning on the screen 260 will carry out a circular motion.

Further, the measurement was carried out in regard to a case where the pitch of diffraction grating displayed on the liquid crystal display is d=32 μm (in this case, the diffraction angle of the primary diffraction light was approximately 1 degree), and the changing speed of the grating line disposition angle ξ was set to various values. The changing speed of the angle ξ becomes a parameter for determining the motion speed of light used for scanning on the screen 260. Here, a speed in the tangential direction of the circular motion on the screen 260 was used as the motion speed of the light. Also, on the abscissa of the graph of FIG. 13, since the motion speed shown in the unit of "mm/sec" is the scanning speed of light on the screen 260, the speed becomes a value obtained by multiplying the speed in the tangential direction of circular motion on the hologram recording medium 220 by a predetermined projection magnification.

In the measurement system used for the experiment, such a setting was adopted, in which the effective diameter of emission light of the lens of the projection optical system 250 is 50 mm, the F number is 1.8, the distance between the lens and the screen 260 is approximately 7 m, the maximum angle to observe the hologram recording medium 220 from the center point of the spatial light modulator 240 is 15 degrees, and the maximum angle to observe the spatial light modulator 240 from the lens of the projection optical system 250 is 15 degrees. In such a setting, a modulated image on the spatial light modulator 240 is displayed by being magnified approximately 80 times on the screen 260. Therefore, light on the screen 260 will be subjected to scanning at a faster speed by approximately 80 times than the motion speed of light which scans on the hologram recording medium 220.

The graph of FIG. 13 shows the measurement result in regard to seven distribution angles of incident light θ. That is, seven results in which the distribution angles of incident light θ is 0, 0.2, 0.4, 0.6, 1, 3, and 5 degrees are plotted therein. As described above, the value of the distribution angle of incident light θ is determined depending on the characteristics and arrangement of the spatial light modulator 240, the characteristics and arrangement of the projection optical system 250, and the characteristics of the recorded scatter plate 230. For example, if the plane size of the spatial light modulator 240 is made small, and the projection magnification by the projection optical system 250 is made large, the distribution angle of incident light θ is increased although the same image size is obtained on the same screen 260. Therefore, respective settings are carried out so that the seven distribution angles of incident light θ can be obtained by variously changing the parameters which are the characteristics and arrangement of the spatial light modulator 240 and the characteristics and arrangement of the projection optical system 250, measurement was made for the value of the speckle contrast in regard to each of the settings.

In addition, as described above, the distribution angle of incident light θ takes a different value for each of the positions on the screen 260. The distribution angle of incident light θ becomes greater toward the middle of the screen 260, and becomes smaller toward the end parts of the screen 260. Therefore, herein, the smallest value among the distribution angles of incident light θ with respect to respective projection points on the screen 260 is made into the minimum distribution angle of incident light (the projection point where the minimum distribution angle of incident light is obtained is a projection point at the end parts of the screen 260), wherein seven distribution angles of incident light θ which are 0, 0.2, 0.4, 0.6, 1, 3 and 5 degrees were set on the basis of the projection point where the minimum distribution angle of incident light can be obtained. Therefore, the condition setting in which the result of the distribution angle of incident light θ was 0.2 degrees was obtained in the graph of FIG. 13 means the condition setting in which the distribution angle of incident light θ was 0.2 degrees was obtained at a projection point (at the end part of the screen 260) at which the minimum distribution angle of incident light is obtained on the screen 260 (As a matter of course, a distribution angle of incident light θ which is more than this was obtained at the middle part of the screen 260). It means that such a setting in which at least the distribution angle of incident light θ of 0.2 degrees is obtained is carried out at any point on the screen 260.

Looking at the graph of FIG. 13, it is found that a significant difference is produced with respect to the value of speckle contrast between the result in which the distribution angle of incident light θ is 0.2 degrees plotted with a circle and the result in which the distribution angle of incident light θ is 0.4 degrees plotted with a triangle. This means that an effect by which speckle generation is remarkably reduced can be obtained by setting the distribution angle of incident light θ to 0.4 degrees or more. In other words, if the characteristics and arrangement of the spatial light modulator 240 and the characteristics and arrangement of the projection optical system 250 are set so that any one of the distribution angles of incident light with respect to an optional point on the screen 260 becomes 0.4 degrees or more, an effect by which speckle generation can be remarkably reduced can be brought about. This means that, in the setting by which the distribution angle of incident light becomes 0.4 degrees or more, the incident angle is sufficiently multiplexed at one projection point (a number of angle modes not having any correlation with each other are incorporated).

Next, where such a premise is established by which the setting is carried out by which the distribution angle of incident light with respect to any optional point on the screen 260 becomes 0.4 degrees or more, an ideal condition by which the speckle contrast similar to that of the apparatus using a "non-coherent light source" is obtained is taken into consideration. As described above, in the case of usage for image display in HDTV (High-Definition Television), the standard in which the speckle contrast is 6.0% or less is shown as the level at which the brightness unevenness pattern is hardly recognizable when an observer observes the image with the naked eye. As has been understood from the graph shown in FIG. 13, unless the scanning of light is carried out by the time-changing-light-bending-device 215, it is absolutely impossible to obtain an ideal speckle contrast which is 6.0% or less (according to the result in which the motion speed is 1 mm per second, the speckle contrast is 10% or more in any case).

Therefore, it is a premise that, in order to obtain an ideal speckle contrast, the scanning of illumination light for reproduction on the hologram recording medium 220 is carried out by the time-changing-light-bending-device 215. As shown in the graph, the higher the motion speed becomes, the lower the speckle contrast becomes. However, on the premise in which the distribution angle of incident light is caused to become 0.4 degrees or more, it is understood that it is sufficient that the motion speed is set to 200 mm or more per second in order to obtain an ideal speckle contrast of 6.0% or less.

Although the present inventor carried out similar experiments using various types of forward projection screens which are currently available on the market, the results which are similar to those in the graph shown in FIG. 13 were obtained in either case. In addition, similar experiments were carried out by using a plurality of different scatter plates with respect to the scatter plate 230 that becomes an original image recorded in the hologram recording medium 220, the results which are similar to those in the graph shown in FIG. 13 were obtained in either case. Therefore, it can be said that the experimental results shown in the graph of FIG. 13 have universality not depending on the characteristics of a scatter plate used, etc., if the screen is a forward projection type screen (As a matter of course, it is a premise that a scatter plate used has sufficient scatter characteristics necessary to carry out the invention.).

Eventually, in the case of the forward projection type embodiment shown in FIG. 3, the conditions are obtained as the ideal numerical value conditions, by which the characteristics (in particular, the size of the modulated image generation surface) and arrangement of the spatial light modulator 240, and the characteristics (in particular, the aperture diameter and the focal distance of lenses) and arrangement of the projection optical system 250 are set so that the distribution angle of incident light at any optional point on the screen becomes 0.4 degrees or more (in other words, so that the distribution angle of incident light at any position on the screen becomes 0.4 degrees or more), and bending operation of coherent light (light scanning operation on a recording surface of the hologram recording medium 220) by the time-changing-light-bending-device 215 is carried out so that the linear speed of light used for scanning on the screen 260 becomes 200 mm or more per second. For example, in a case where the modulated image on the spatial light modulator 240 is magnified by approximately 80 times on the screen 260, it is sufficient that the light scanning speed on a recording surface of the hologram recording medium 220 is set to 2.5 mm or more per second.

Further, where a light beam is subjected to a circular motion as shown in FIG. 9 (or an elliptical motion) on the hologram recording medium 220, since the linear speed of light can be maintained at a fixed speed, the fixed speed (the moving speed on the screen) may be set to become 200 mm or more per second. However, where being subjected to oscillation as shown in FIG. 7, it is not possible that the linear speed of light is maintained at a fixed speed. That is, since the motion speed temporarily becomes zero at the end point of the oscillation, speckles will be observed at that moment. Therefore, where being subjected to oscillation, it is preferable that the standstill time at the end point is controlled to a short time in which speckles cannot be observed. In detail, where a moving image is displayed as an image, it is preferable that the standstill time at the end point is controlled to 1/30 seconds or less, which is a usual moving image bit rate.

Further, although the present inventor carried out an experiment in which the amplitude in oscillation shown in FIG. 7 and the radius of a circular motion shown in FIG. 9 (in other words, the degree of bending by the time-changing-light-bending-device 215) are changed in several ways, there was no significant difference in the speckle contrast. This means that the factor which influences reduction in the speckle contrast is not the scanning distance of light on the screen but the scanning speed. Therefore, it does not matter that bending angle of the coherent light by the time-changing-light-bending-device 215 is slight. However, scanning of light by the actual time-changing-light-bending-device 215 is not analog scanning but digital scanning. For example, where a liquid crystal display was used as the time-changing-light-bending-device 215, the frame rate of the display image is limited per apparatus, and a change of the diffraction grating pattern which becomes an object to be displayed is carried out by changing the frames. Accordingly, in actual application, it is preferable to set so that a significant change can be observed in the diffraction grating pattern frame by frame and the light beam can scan as continuously and as smoothly as possible. In detail, where a general liquid crystal display having a frame rate which is 30 frames per second is used, it is sufficient to use a diffraction grating pattern by which a diffraction angle of approximately ±0.5 degrees can be obtained.

<<<Section 6. Application to Color Image Display Apparatus>>>

The embodiments described above are examples in which monochrome laser (in detail, DPSS laser the wavelength λ of which is 532 nm (green)) is used as the coherent light source 210. The images obtained on the screen 260 will be monochrome images corresponding to the laser color. However, when utilizing the same in a general optical type projection apparatus, it is preferable that the display apparatus is utilized as a color image display apparatus. Therefore, herein, a description is given of an embodiment in which the apparatus according to the present invention is used as a color image display apparatus.

Figure 14:
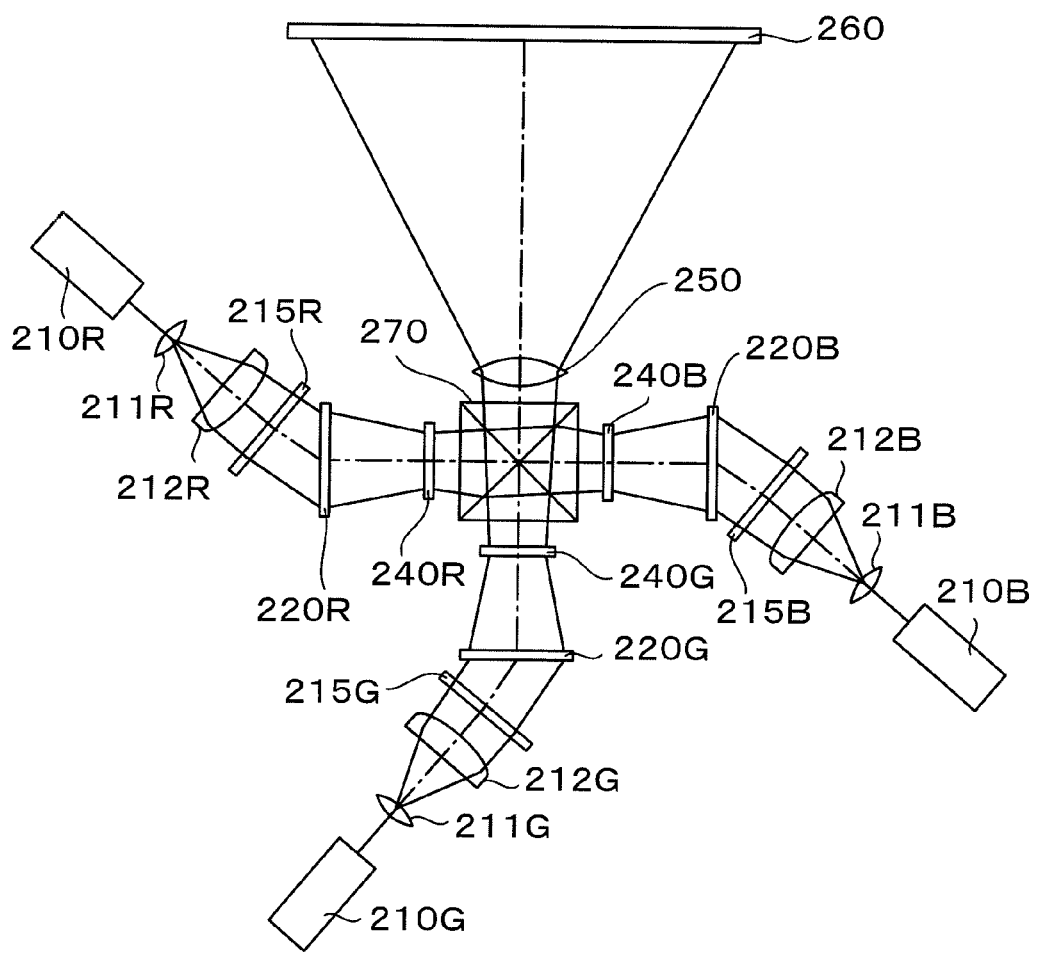
FIG. 14 is a plan view showing an embodiment in which the present invention is applied to a color image display apparatus.

FIG. 14 is a plan view showing an embodiment in which the present invention is applied to a color image display apparatus. In order to apply the present invention to a color image display apparatus, basically, the portions not including the projection optical system 250 and the screen 260 among the components shown in FIG. 3 are prepared for each of the three primary colors R, G and B, modulated images are independently generated for each of the three primary colors R, G and B, and the three modulated images are synthesized and are projected on a screen.

A cross dichroic prism 270 shown at the middle part of FIG. 14 has a function of synthesizing the modulated images for each of the three primary colors R, G and B and an image thus synthesized is projected onto the screen 260 by the projection optical system 250.

The components disposed downward of the cross dichroic prism 270 are components to generate modulated images of G color (green), which are composed of a coherent light source (laser) 210G, a magnification lens 211G, a collimate lens 212G, a time-changing-light-bending-device 215G (for example, a liquid crystal micro-display), a hologram recording medium 220G, and a spatial light modulator (for example, a liquid crystal micro-display) 240G. These respective components are identical to the coherent light source 210, the magnification lens 211, the collimate lens 212, the time-changing-light-bending-device 215, the hologram recording medium 220, and the spatial light modulator 240, which are shown in FIG. 3. A G-color component image of a color image to be displayed is modulated by the spatial light modulator 240G to generate a G-color modulated image.

On the other hand, the components disposed leftward of the cross dichroic prism 270 are components to generate modulated images of R color (red), which are composed of a coherent light source (laser) 210R, a magnification lens 211R, a collimate lens 212R, a time-changing-light-bending-device 215R (for example, a liquid crystal micro-display), a hologram recording medium 220R, and a spatial light modulator (for example, a liquid crystal micro-display) 240R. These respective components correspond to the coherent light source 210, the magnification lens 211, the collimate lens 212, the time-changing-light-bending-device 215, the hologram recording medium 220, and the spatial, light modulator 240, which are shown in FIG. 3. Since it is necessary to generate a modulated image of R color, a laser light source for emitting laser light having a wavelength band of R color is used as the coherent light source 210R. In addition, in the recording process (refer to FIG. 4) of a scatter plate on the hologram recording medium 220R, R-color illumination light L and R-color reference light Lr are used. By irradiating R-color illumination light for reproduction LL, an R-color reproduction real image 235 will be formed. And, an R-color component image of a color image to be displayed is modulated by the spatial light modulator 240R to generate an R-color modulated image.

Similarly, the components disposed rightward of the cross dichroic prism 270 are components to generate modulated images of B color (blue), which are composed of a coherent light source (laser) 210B, a magnification lens 211B, a collimate lens 212B, a time-changing-light-bending-device 215B (for example, a liquid crystal micro-display), a hologram recording medium 220B, and a spatial light modulator (for example, a liquid crystal micro-display) 240B. These respective components correspond to the coherent light source 210, the magnification lens 211, the collimate lens 212, the time-changing-light-bending-device 215, the hologram recording medium 220, and the spatial light modulator 240, which are shown in FIG. 3. However, since it is necessary to generate a modulated image of B color, a laser light source for emitting laser light having a wavelength band of B color is used as the coherent light source 210B. In addition, in the recording process (refer to FIG. 4) of a scatter plate on the hologram recording medium 220B, B-color illumination light L and B-color reference light Lr are used. By irradiating B-color illumination light for reproduction LL, a B-color reproduction real image 235 will be formed. And, a B-color component image of a color image to be displayed is modulated by the spatial light modulator 240B to generate a B-color modulated image.

The R-color modulated image generated by the spatial light modulator 240R, the G-color modulated image generated by the spatial light modulator 240G and the B-color modulated image generated by the spatial light modulator 240B are synthesized by the cross dichroic prism 270, and the color image thus synthesized is projected onto the screen 260 by the projection optical system 250.

Thus, where the present invention is applied to a projection type image display apparatus for projecting light onto a screen and displaying a color image, the first wavelength band, the second wavelength band and the third wavelength band, which correspond to three primary color components, are set, and modulated imaging portions which are independent from each other may be provided for individual wavelength bands.

Here, the first modulation image providing portion includes the first unit for generating coherent light of the first wavelength band, which consists of a parallel light flux, the first time-changing-light-bending-device having a function of bending the coherent light generated by the first coherent light generating unit in a predetermined bending direction by a predetermined bending angle and a function of changing at least one of the bending direction and the bending angle in terms of time, the first hologram recording medium for generating the first hologram reproduction real image of the scatter plate by receiving the coherent light, which is bent by the first time-changing-light-bending-device, as illumination light for reproduction, and the first spatial light modulator disposed so as to overlap on the position where the first hologram reproduction real image is formed, which carries out modulation based on the image having the first prime color component corresponding to the first wavelength band.

Also, the second modulation image providing portion includes the second unit for generating coherent light of the second wavelength band, which consists of a parallel light flux, the second time-changing-light-bending-device having a function of bending the coherent light generated by the second coherent light generating unit in a predetermined bending direction by a predetermined bending angle and a function of changing at least one of the bending direction and the bending angle in terms of time, the second hologram recording medium for generating the second hologram reproduction real image of the scatter plate by receiving the coherent light, which is bent by the second time-changing-light-bending-device, as illumination light for reproduction, and the second spatial light modulator disposed so as to overlap on the position where the second hologram reproduction real image is formed, which carries out modulation based on the image having the second prime color component corresponding to the second wavelength band.

On the other hand, the third modulation image providing portion includes the third unit for generating coherent light of the third wavelength band, which consists of a parallel light flux, the third time-changing-light-bending-device having a function of bending the coherent light generated by the third coherent light generating unit in a predetermined bending direction by a predetermined bending angle and a function of changing at least one of the bending direction and the bending angle in terms of time, the third hologram recording medium for generating the third hologram reproduction real image of the scatter plate by receiving the coherent light, which is bent by the third time-changing-light-bending-device, as illumination light for reproduction, and the third spatial light modulator disposed so as to overlap on the position where the third hologram reproduction real image is formed, which carries out modulation based on the image having the third prime color component corresponding to the third wavelength band.

And, the projection type image display apparatus capable of displaying color images may be further provided with an image-synthesizing projection optical system for synthesizing the first modulated image obtained on the first spatial light modulator, the second modulated image obtained on the second spatial light modulator and the third modulated image obtained on the third spatial light modulator and projecting the same on a screen. In addition, it is not necessary that the bending motions of coherent light by the first time-changing-light-bending-device, the second time-changing-light-bending-device and the third time-changing-light-bending-device are synchronized with each other. In other words, it is not necessary that the scanning motions on the screen 260 with respect to the R-color light beam, the G-color light beam and the B-color light beam maintain any relativity to each other. This is because the scanning motion is carried out for the purpose of blocking recognition of speckles, and even if the light of respective colors are used for scanning independently from each other, the purpose can be sufficiently achieved.

What is claimed is:
1. A projection type image display apparatus for projecting light onto a screen and displaying an image thereon, comprising:
   a coherent light generating unit for generating coherent light including almost parallel light flux;
   a light bending device having a function of bending the coherent light generated by the coherent light generating unit in a predetermined bending direction at a predetermined bending angle and a function of changing at least one of the bending direction and the bending angle in terms of time;
   a hologram recording medium for generating a hologram reproduction real image of a scatter plate by receiving the coherent light, which is bent by the light bending device, as illumination light for reproduction;
   a spatial light modulator disposed so as to overlap on a position where the hologram reproduction real image is generated; and a projection optical system for projecting a modulated image obtained on the spatial light modulator onto the screen;

wherein the light bending device includes a transmission type or reflection type liquid crystal display having resolution required to display a diffraction grating pattern having a function of diffracting coherent light, and a display controller to give electrical signals to the liquid crystal display so that the diffraction grating pattern changes in terms of time, and the coherent light generated by the coherent light generating unit is bent by diffraction by the diffraction grating pattern.

2. The projection type image display device according to claim 1, wherein the display controller changes a bending angle of the coherent light in terms of time by cyclically increasing and decreasing a pitch of grating lines of the diffraction grating pattern, and controls so that the diffracted coherent light oscillates in a direction orthogonal to the grating lines.

3. The projection type image display apparatus according to claim 1, wherein the display controller changes a bending direction of the coherent light in terms of time by changing a direction of grating lines of the diffraction grating pattern, and controls so that a light path of the diffracted coherent light cyclically moves along a conical surface.

4. The projection type image display apparatus according to claim 1, wherein the display controller changes a bending angle of the coherent light in terms of time by cyclically increasing and decreasing a pitch of grating lines of the diffraction grating pattern and changes a bending direction of the coherent light in terms of time by changing a direction of grating lines of the diffraction grating pattern, and controls the diffracted coherent light so as to cyclically move with a motion component by which the diffracted coherent light oscillates in a direction orthogonal to the grating lines and a motion component by which a light path cyclically moves along a conical surface.

5. The projection type image display apparatus according to claim 1, wherein the coherent light generating unit includes:

a laser light source for generating and emitting laser light; and a light flux magnifying unit for magnifying the laser light emitted from the laser light source to an almost parallel light flux having a predetermined sectional area.

6. The projection type image display apparatus according to claim 1, wherein the hologram recording medium is composed of a volume hologram using a photopolymer.

7. The projection type image display apparatus according to claim 1, wherein the coherent light generating unit generates coherent light having a wavelength which is almost the same as a wavelength of light used when recording an image of a scatter plate on the hologram recording medium; and the light bending device changes the coherent light, using a light path of a reference light used to record an image of a scatter plate on the hologram recording medium as a standard light path, so that an incident light path of the coherent light onto the hologram recording medium cyclically moves around a vicinity of the standard light path.

8. A projection type image display apparatus for projecting light onto a screen and displaying an image thereon comprising:

a coherent light generating unit for generating coherent light including almost parallel light flux;

a light bending device having a function of bending the coherent light generated by the coherent light generating unit in a predetermined bending direction at a predetermined bending angle and a function of changing at least one of the bending direction and the bending angle in terms of time;

a hologram recording medium for generating a hologram reproduction real image of a scatter plate by receiving the coherent light, which is bent by the light bending device, as illumination light for reproduction;

a spatial light modulator disposed so as to overlap on a position where the hologram reproduction real image is generated; and a projection optical system for projecting a modulated image obtained on the spatial light modulator onto the screen;

wherein the light bending device includes a digital micro-mirror device and a direction controller by which electrical signals to control a direction of individual mirrors are given to the digital micro-mirror device, and the coherent light generated by the coherent light generating unit is bent based on reflection by the digital micro-mirror device.

9. The projection type image display apparatus according to claim 8, wherein the direction controller changes a bending angle of the coherent light in terms of time by giving electrical signals which cause individual mirrors of the digital micro-mirror device to oscillate so that respective normals of the mirrors oscillate on respective oscillation surfaces which are parallel to a predetermined reference plane, and controls reflected coherent light so that the reflected coherent light oscillates.

10. The projection type image display apparatus according to claim 8, wherein the direction controller changes a bending direction of the coherent light in terms of time by giving electrical signals which cause individual mirrors of the digital micro-mirror device to move so that respective normals of the mirrors move along predetermined respective conical surfaces and controls reflected coherent light so that a light path of the reflected coherent light cyclically moves along the conical surfaces.

11. The projection type image display apparatus according to claim 8, wherein the direction controller changes a bending direction and a bending angle of the coherent light in terms of time by giving electrical signals which cause individual mirrors of the digital micro-mirror device to cyclically move so that respective normals of the mirrors move with a motion component by which said normals are caused to oscillate on respective oscillation surfaces which are parallel to a predetermined reference plane and a motion component by which said normals are caused to cyclically move along conical surfaces.

12. The projection type image display apparatus according to claim 8, wherein the coherent light generating unit includes:

a laser light source for generating and emitting laser light; and a light flux magnifying unit for magnifying the laser light emitted from the laser light source to an almost parallel light flux having a predetermined sectional area.

13. The projection type image display apparatus according to claim 8, wherein the hologram recording medium is composed of a volume hologram using a photopolymer.

14. The projection type image display apparatus according to claim 8, wherein the coherent light generating unit generates coherent light having a wavelength which is almost the same as a wavelength of light used when recording an image of a scatter plate on the hologram recording medium; and the light bending device changes the coherent light, using a light path of a reference light used to record an image of a scatter plate on the hologram recording medium as a standard light path, so that an incident light path of the coherent light onto the hologram recording medium cyclically moves around a vicinity of the standard light path.

* * * * *